(12) United States Patent
Picinini

(10) Patent No.: US 12,277,392 B2
(45) Date of Patent: Apr. 15, 2025

(54) TECHNIQUES FOR ENHANCING THE QUALITY OF HUMAN ANNOTATION

(71) Applicant: eBay Inc., San Jose, CA (US)

(72) Inventor: Silvio Roberto Picinini, Tracy, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 18/099,891

(22) Filed: Jan. 20, 2023

(65) Prior Publication Data

US 2023/0161961 A1    May 25, 2023

Related U.S. Application Data

(63) Continuation of application No. 16/989,879, filed on Aug. 10, 2020, now Pat. No. 11,586,820.

(51) Int. Cl.
*G06F 17/00*      (2019.01)
*G06F 16/9535*    (2019.01)
*G06F 16/9538*    (2019.01)
*G06F 40/169*     (2020.01)
*G06F 40/284*     (2020.01)
*G06N 20/00*      (2019.01)

(52) U.S. Cl.
CPC ........ *G06F 40/284* (2020.01); *G06F 16/9535* (2019.01); *G06F 16/9538* (2019.01); *G06F 40/169* (2020.01); *G06N 20/00* (2019.01)

(58) Field of Classification Search
CPC ............... G06F 40/284; G06F 16/9535; G06F 16/9538; G06F 40/169; G06N 20/00
See application file for complete search history.

(56) References Cited

U.S. PATENT DOCUMENTS

| 7,668,821 | B1  |  2/2010 | Donsbach et al. |
| 7,809,723 | B2* | 10/2010 | Liu ........................ G06N 20/10 |
|           |     |         | 707/736 |
| 7,861,154 | B2* | 12/2010 | MacLaurin ........... G06F 40/169 |
|           |     |         | 715/255 |
| 8,090,724 | B1* |  1/2012 | Welch .................. G06V 30/268 |
|           |     |         | 707/750 |

(Continued)

OTHER PUBLICATIONS

Final Office Action received for U.S. Appl. No. 16/989,879, mailed on Jun. 24, 2022, 20 pages.

(Continued)

*Primary Examiner* — Mohammed H Zuberi
(74) *Attorney, Agent, or Firm* — SCHWEGMAN LUNDBERG & WOESSNER, P.A.

(57) ABSTRACT

Methods for enhancing or automating a review process of annotation tags for a set of tokens is described. A system may receive a list of tokens with associated tags for each token for a data set and may output any identified inconsistencies where a token is assigned at least two different tags. For example, instead of a human looking at each token individually or taking a sample set of the tags for review, the described techniques may look at all tokens with the associated tags in a set of data and may leverage reorganizing the tokens and associated tags to highlight errors to be fixed. Accordingly, the system may look across all tokens within an entire data set, while a review (e.g., by a human) of possible errors of the data set is limited to the highlighted errors flagged by the system.

17 Claims, 12 Drawing Sheets

(56) References Cited

U.S. PATENT DOCUMENTS

| | | | |
|---|---|---|---|
| 8,156,053 B2 | 4/2012 | Mika et al. | |
| 8,892,422 B1 | 11/2014 | Kumar | |
| 9,477,655 B2 | 10/2016 | Pestian et al. | |
| 9,639,880 B2 | 5/2017 | Dalal et al. | |
| 9,875,497 B1 | 1/2018 | Kotas et al. | |
| 9,959,326 B2 | 5/2018 | Duan et al. | |
| 10,394,841 B2 | 8/2019 | Denman et al. | |
| 10,437,838 B2 | 10/2019 | Spathelf et al. | |
| 10,650,086 B1* | 5/2020 | Knudson | G06F 40/134 |
| 10,891,985 B1 | 1/2021 | Farre et al. | |
| 11,210,721 B1 | 12/2021 | Feng et al. | |
| 2003/0212544 A1* | 11/2003 | Acero | G06F 40/30 704/9 |
| 2007/0208679 A1 | 9/2007 | Tseng et al. | |
| 2009/0307161 A1 | 12/2009 | Dalal et al. | |
| 2010/0198831 A1 | 8/2010 | Feng et al. | |
| 2010/0250304 A1* | 9/2010 | Whitaker | G06Q 10/0639 715/230 |
| 2010/0274783 A1* | 10/2010 | Chevalier | G06F 16/24578 707/723 |
| 2010/0281023 A1* | 11/2010 | Chevalier | G06F 16/24578 707/723 |
| 2010/0306141 A1* | 12/2010 | Chidlovskii | G06N 20/00 706/13 |
| 2011/0106823 A1* | 5/2011 | Urbschat | G06F 16/30 707/754 |
| 2011/0153666 A1* | 6/2011 | Flynn | G06F 16/2428 707/E17.062 |
| 2011/0289026 A1* | 11/2011 | Kannan | G06Q 30/00 707/E17.014 |
| 2011/0307483 A1* | 12/2011 | Radlinski | G06F 16/24578 707/E17.084 |
| 2014/0122498 A1 | 5/2014 | Mok et al. | |
| 2015/0066657 A1 | 3/2015 | Terrill et al. | |
| 2015/0142813 A1 | 5/2015 | Burgmeier et al. | |
| 2016/0103923 A1 | 4/2016 | Thomas et al. | |
| 2016/0314106 A1* | 10/2016 | Carrier | G06F 40/242 |
| 2019/0012302 A1* | 1/2019 | MacMahon | G06F 16/9558 |
| 2019/0287019 A1 | 9/2019 | Bannur et al. | |
| 2020/0037019 A1 | 1/2020 | Liusaari et al. | |
| 2020/0410053 A1* | 12/2020 | Zhang | G06N 3/02 |
| 2021/0097105 A1 | 4/2021 | Al et al. | |
| 2021/0099407 A1 | 4/2021 | Al et al. | |
| 2021/0103615 A1 | 4/2021 | Jindal et al. | |
| 2021/0201228 A1* | 7/2021 | Galginaitis | G06N 20/00 |
| 2021/0271815 A1 | 9/2021 | Li et al. | |
| 2022/0043976 A1 | 2/2022 | Picinini | |

OTHER PUBLICATIONS

Non-Final Office Action received for U.S. Appl. No. 16/989,879, mailed on Feb. 2, 2022, 21 pages.

Notice of Allowance received for U.S. Appl. No. 16/989,879, mailed on Oct. 24, 2022, 6 pages.

Picinini, S., Harvesting Polysemous Terms from e-commerce data to enhance QA, Proceedings of MT Summit XVI vol. 2 Commercial MT Users and Translators Track, Nagoya, Sep. 18-22, 2017, 7 pages.

U.S. Appl. No. 16/989,879 U.S. Pat. No. 11,586,820, filed Aug. 10, 2020 Techniques for Enhancing the Quality of Human Annotation.

"U.S. Appl. No. 16/989,879, Examiner Interview Summary mailed Sep. 2, 2022", 2 pgs.

* cited by examiner

TECHNIQUES FOR ENHANCING THE QUALITY OF HUMAN ANNOTATION

CROSS REFERENCE

The present Application for Patent is a continuation of U.S. patent application Ser. No. 16/989,879 by PICININI, entitled "TECHNIQUES FOR ENHANCING THE QUALITY OF HUMAN ANNOTATION," filed Aug. 10, 2020, assigned to the assignee hereof, and expressly incorporated by reference herein.

FIELD OF TECHNOLOGY

The present disclosure relates generally to database systems and data processing, and more specifically to improving the quality of human annotation.

BACKGROUND

Computer networks permit the transport of data between interconnected computers. Search engine technology permits a user to obtain information from a vast array of sources available via a computer network. A search engine may be a program that searches for and identifies content in a database that correspond to keywords or characters input by the user and may return websites available via the Internet based on the search. To generate a search, a user may interact with a user device, such as a computer or mobile phone, to submit a search query via a search engine. The search engine may execute the search and display results for the search query based on communication with other applications and servers.

In some implementations, when generating search results, search engines and other applications may use annotation tags assigned to tokens in a data set. For example, an annotation tag may indicate a contextual meaning assigned to a token within the context of a data set. Search engines, for instance, may parse a received search query to identify a token, and may use a corresponding annotation tag for the token to identify a contextual meaning assigned to the token to produce higher quality search results. Conventional annotation techniques are deficient.

SUMMARY

A computer implemented method of tag annotation is described. The computer implemented method may include receiving an indication of a set of tokens for a data set and a set of tag values assigned to the set of tokens, each tag value being an annotation that indicates a contextual meaning assigned to a respective token of the set of tokens within a context of the data set; identifying, based on the set of tokens and the set of tag values, a subset of the set of tokens that have been assigned two or more different tag values of the set of tag values; and outputting the subset of the set of tokens and an indication that multiple different contextual meanings within the context of the data set have been assigned to each token in the subset of the set of tokens.

A system for tag annotation is described. The apparatus may include one or more processors and a computer readable medium storing instructions. The instructions may be executable by the one or more processors to cause the system to perform operations including receiving an indication of a set of tokens for a data set and a set of tag values assigned to the set of tokens, each tag value being an annotation that indicates a contextual meaning assigned to a respective token of the set of tokens within a context of the data set; identifying, based on the set of tokens and the set of tag values, a subset of the set of tokens that have been assigned two or more different tag values of the set of tag values; and outputting the subset of the set of tokens and an indication that multiple different contextual meanings within the context of the data set have been assigned to each token in the subset of the set of tokens.

An apparatus for tag annotation is described. The apparatus may include means for receiving an indication of a set of tokens for a data set and a set of tag values assigned to the set of tokens, each tag value being an annotation that indicates a contextual meaning assigned to a respective token of the set of tokens within a context of the data set; means for identifying, based on the set of tokens and the set of tag values, a subset of the set of tokens that have been assigned two or more different tag values of the set of tag values; and means for outputting the subset of the set of tokens and an indication that multiple different contextual meanings within the context of the data set have been assigned to each token in the subset of the set of tokens.

A non-transitory computer-readable medium for tag annotation is described. The non-transitory computer-readable medium may store instructions which, when executed by a processor, cause the processor to perform operations including receiving an indication of a set of tokens for a data set and a set of tag values assigned to the set of tokens, each tag value being an annotation that indicates a contextual meaning assigned to a respective token of the set of tokens within a context of the data set; identifying, based on the set of tokens and the set of tag values, a subset of the set of tokens that have been assigned two or more different tag values of the set of tag values; and outputting the subset of the set of tokens and an indication that multiple different contextual meanings within the context of the data set have been assigned to each token in the subset of the set of tokens.

Some examples of the method, system, apparatus, and non-transitory computer-readable medium described herein may further include operations, features, means, or instructions for outputting a revised token-tag list based on the subset of the set of tokens.

Some examples of the method, system, apparatus, and non-transitory computer-readable medium described herein may further include operations, features, means, or instructions for receiving a search query via an online marketplace, a search engine, or a combination thereof, identifying, based on a machine learning algorithm trained using the revised token-tag list and the data set, a first token in the search query and a first tag value corresponding to the token, searching a content source based on the first token and the first tag value, and outputting a search result based on the searching.

Some examples of the method, system, apparatus, and non-transitory computer-readable medium described herein may further include operations, features, means, or instructions for identifying a first token of the subset of the set of tokens, and assigning a first tag value of the set of tag values to each occurrence of the first token.

In some examples of the method, system, apparatus, and non-transitory computer-readable medium described herein, identifying the subset of the set of tokens may include operations, features, means, or instructions for determining, based on the set of tokens and the set of tag values, that a first tag value may be assigned to a first occurrence of a first token within the data set and a second tag value may be assigned to a second occurrence of the first token within the data set, the first tag value differing from the second tag value, where the outputting includes, and causing presentation of the first tag value, the second tag value, and the first token via a user interface.

In some examples of the method, system, apparatus, and non-transitory computer-readable medium described herein, identifying the subset of the set of tokens may include operations, features, means, or instructions for determining an occurrence count for each tag value assigned to a first token of the set of tokens, for each token associated with a first tag value of the set of token values, or a combination thereof, the occurrence count including a number of times that each tag value appears for the first token, a number of times each token appears for the first tag value, or a combination thereof, and causing presentation of the occurrence count via a user interface.

In some examples of the method, system, apparatus, and non-transitory computer-readable medium described herein, identifying the subset of the set of tokens may include operations, features, means, or instructions for receiving an assigned tag value or an annotation guideline for a first token of the subset of the set of tokens, where the subset of the set of tokens may be identified based on the assigned tag value or the annotation guideline.

Some examples of the method, system, apparatus, and non-transitory computer-readable medium described herein may further include operations, features, means, or instructions for determining a first tag value of the set of tag values may be assigned to a first occurrence of a first token of the subset of the set of tokens, where the outputting includes, and causing presentation of the first tag value for a next occurrence of the first token within the data set.

In some examples of the method, system, apparatus, and non-transitory computer-readable medium described herein, outputting the subset of the set of tokens may include operations, features, means, or instructions for causing presentation of the subset of the set of tokens via a user interface.

In some examples of the method, system, apparatus, and non-transitory computer-readable medium described herein, each token of the set of tokens may include a word, a character sequence, a span of multiple words or character sequences, or a combination thereof.

DETAILED DESCRIPTION

Figure 1:
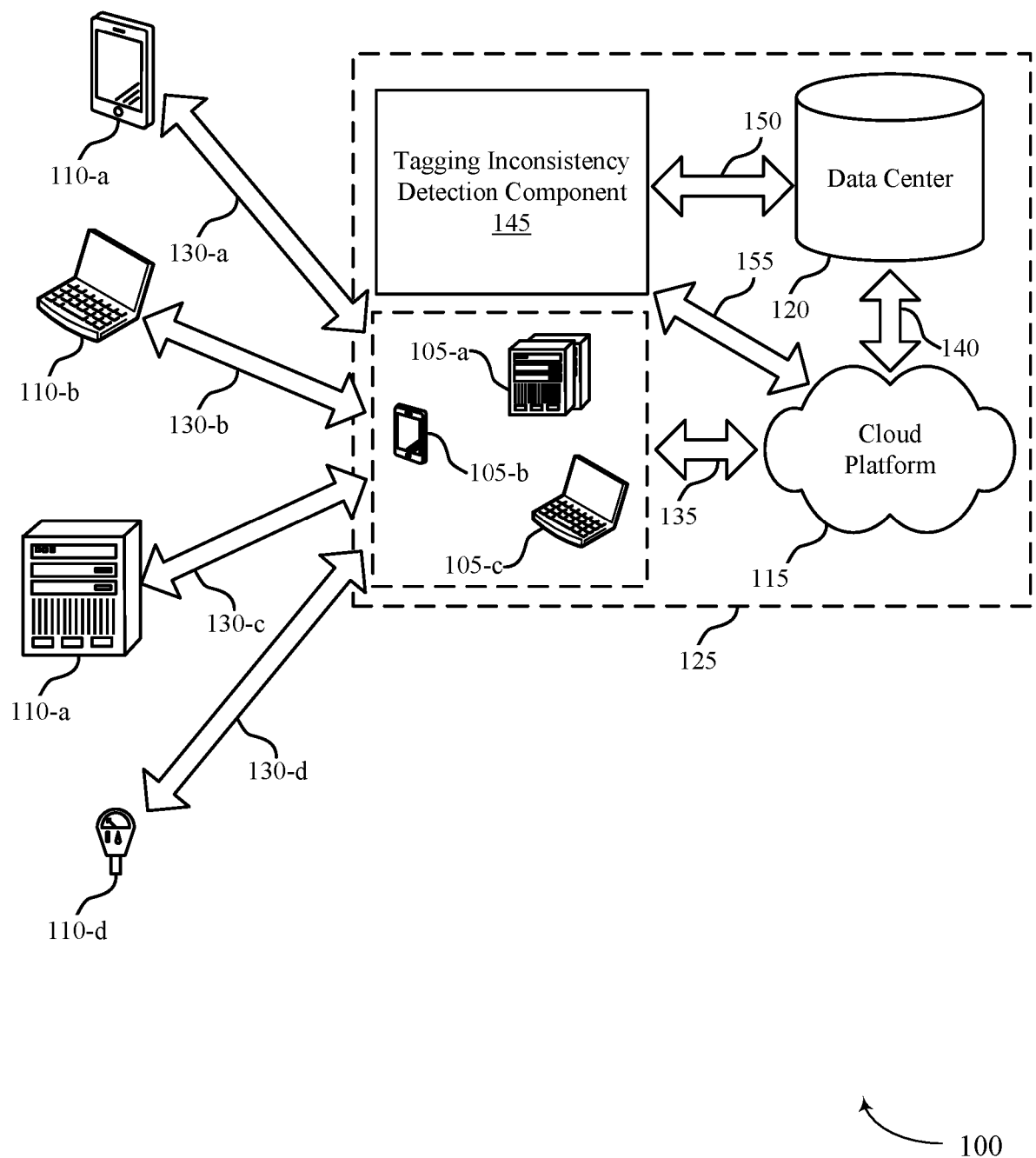
FIG. 1 illustrates an example of a system for tag annotation that supports improving the quality of human annotation in accordance with aspects of the present disclosure.

Different technologies may benefit from improving tag annotation of tokens included in a data set, where the annotation assigns a tag to each token in the data set. A token may refer to a word, character sequence, or the like, included in a data set (e.g., a newspaper article, a book, a search query, etc.) and the tag may be an annotation that indicates a contextual meaning assigned to a token within the context of the data set. The word "apple" is an example of a token that may be included in a newspaper article, and the token may be annotated with a tag to indicate whether the word apple in the article is referring to the technology company or a fruit.

Artificial intelligence (AI) and machine learning may rely on data that is annotated by humans to train and test associated models. In some cases, to ensure quality of the annotation and tagging, a second human may review tags originally linked to each token by a first human. However, using humans to manually provide the initial annotation and to check the annotation work may result in inconsistencies between tags that are applied to a same token. When handling thousands of tokens at a time, the second human reviewing the annotation work may not identify or catch such an error. As such, the review quality of annotation tags (e.g., quality assurance) may be dependent on the quality of a human reviewing the annotation tags and of the work by the human (e.g., as the reviewer may get tired). A data set used to train a machine learning algorithm may degrade performance of such an algorithm when tokens in the training data set are inconsistently and incorrectly tagged.

As described herein, techniques are described for enhancing or automating a review process of annotation tags for a set of tokens. A system may receive a list of tokens with associated tags for each token for a data set and may output any identified inconsistencies where a token is assigned at least two different tags. For example, instead of a human looking at each token individually or taking a sample set of the tags for review, the described techniques may look at all tokens with the associated tags in a set of data and may leverage reorganizing the tokens and associated tags to highlight possible errors to be fixed of tokens that have identified inconsistencies of at least two different assigned tags. Accordingly, the system may look across all tokens within an entire data set, while a review (e.g., by a human) of possible errors of the data set is limited to the tokens that have been identified with at least two different tags assigned.

The system may first turn the received list of tokens and their associated tags into a list of token-tag pairs. The complete list of tokens and their associated tags may then become a collection of the token-tag pairs, which may enable a more efficient quality review of the tags. For example, the system may sort the list of token-tag pairs by token and then by tag to create a secondary list that can highlight inconsistencies of tags for the same tokens. Inconsistent tagging may be an indication that multiple different contextual meanings within the context of a data set have been assigned to a same token. The system may then present the identified inconsistencies to a reviewer in a condensed report to prevent a reviewer from checking the entire list of tokens and associated tags. The described techniques may also be applied to spans of tokens. For example, the spans of tokens may include multiple words for a single token that form a single unit of meaning, such as a proper name.

Additionally, the system may identify and extract additional information about the token-tag pairs. For example, the system may identify a frequency of occurrence of a tag for a token for each token-tag pair and present this information to the reviewer. The frequency of occurrence for a tag may reveal tokens that can have more than one valid tag (e.g., "Pearl" can be both a material and a color). Additionally or alternatively, the system may filter the list of token-tag pairs by tag to produce a focused list of tokens that have a tag in common. By looking at this filtered list, the reviewer may more easily identify a token that does not belong with the rest of the tokens for that tag. The filtered list may also use the frequency of occurrence data to indicate the number of times each token appears for a tag.

In some cases, some of the tags being tagged may have lists of values available that can be used for quality checks. This list of available values may be used for quality checks for that tag. Additionally, data (e.g., different tokens/spans) previously tagged may be available for use in the quality checks. The system may check tokens and spans against the history of that same token or span being tagged before, and the system may compare a current tag with the history to identify potential errors and inconsistencies. In some cases, guidelines for tagging may be created, or when defining tags in a taxonomy system, different values that are to receive tags may be defined. The system may then use these guidelines and defined tags to check tags of tokens to identify potential errors or inconsistencies. Additionally or alternatively, the system may provide suggestions of tags for annotating data. For example, the system may pre-tag or provide tag suggestion for data based on available historical or external data.

The system may output a revised list of token-tag pairs (e.g., corrected token-tag pairs) to a machine learning algorithm that performs search functions for an online marketplace (e.g., an e-commerce company), a search engine, etc. The machine learning algorithm may be trained using the data set and the corrected token-tag pairs, and the trained machine learning algorithm may identify one or more tokens in a search query submitted by a user. The machine learning algorithm may identify tags corresponding to the identified one or more tokens to improve search results. In an example, using the token-tag pairs, if the machine learning algorithm identifies that "Apple" is a brand name and not a fruit in a search query, the system may return search results corresponding to the brand name and may omit search results corresponding to the fruit. Thus, the techniques may be used to enhance annotation of tokens with tags and may be used the improved annotation of token-tag pairs for training of a machine learning model.

Aspects of the disclosure are initially described in the context of an environment supporting an on-demand database service for tag annotation. Additionally, aspects of the disclosure are illustrated through an application flow, a system, a user interface, and a process flow. Aspects of the disclosure are further illustrated by and described with reference to apparatus diagrams, system diagrams, and flowcharts that relate to improving the quality of human annotation.

FIG. 1 illustrates an example of a system 100 that supports face detection to address privacy in publishing image datasets in accordance with various aspects of the present disclosure. The system 100 includes cloud clients 105, user devices 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a computing device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be part of a business, an enterprise, a non-profit, a startup, or any other organization type.

A cloud client 105 may facilitate communication between the data center 120 and one or multiple user devices 110 to implement an online marketplace. The network connection 130 may include communications, opportunities, purchases, sales, or any other interaction between a cloud client 105 and a user device 110. A cloud client 105 may access cloud platform 115 to store, manage, and process the data communicated via one or more network connections 130. In some cases, the cloud client 105 may have an associated security or permission level. A cloud client 105 may have access to certain applications, data, and database information within cloud platform 115 based on the associated security or permission level and may not have access to others.

The user device 110 may interact with the cloud client 105 over network connection 130. The network may implement transfer control protocol and internet protocol (TCP/IP), such as the Internet, or may implement other network protocols. The network connection 130 may facilitate transport of data via email, web, text messages, mail, or any other appropriate form of electronic interaction (e.g., network connections 130-a, 130-b, 130-c, and 130-d) via a computer network. In an example, the user device 110 may be computing device such as a smartphone 110-a, a laptop 110-b, and also may be a server 110-c or a sensor 110-d. In other cases, the user device 110 may be another computing system. In some cases, the user device 110 may be operated by a user or group of users. The user or group of users may be a customer, associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support an online application. This may include support for sales between buyers and sellers operating user devices 110, service, marketing of products posted by buyers, community interactions between buyers and sellers, analytics, such as user-interaction metrics, applications (e.g., computer vision and machine learning), and the Internet of Things. Cloud platform 115 may receive data associated with generation of an online marketplace from the cloud client 105 over network connection 135 and may store and analyze the data. In some cases, cloud platform 115 may receive data directly from a user device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or via network connection 130 between a user device 110 and the cloud client 105. Data center 120 may utilize multiple redundancies for security purposes. In some cases, the data stored at data center 120 may be backed up by copies of the data at a different data center (not pictured).

Server system 125 may include cloud clients 105, cloud platform 115, face detection component 145, and data center 120 that may coordinate with cloud platform 115 and data center 120 to implement an online marketplace. In some cases, data processing may occur at any of the components of server system 125, or at a combination of these components. In some cases, servers may perform the data processing. The servers may be a cloud client 105 or located at data center 120.

The system 100 may also include a tagging inconsistency detection component 145. The tagging inconsistency detection component 145 may communicate with cloud platform 115 via connection 155 and may also communicate with data center 120 via connection 150. The tagging inconsistency detection component 145 may receive signals and inputs from user device 110 via cloud clients 105 and via cloud platform 115 or data center 120. Tagging of data via annotation may be used for different implementations, such as generating search results, training machine learning algorithms, etc. As such, ensuring that annotation tags are correctly and consistently assigned to tokens in a data set (e.g., named entity recognition (NER) data) may be used for performing these different implementations to improve user experience. As described herein, the tagging inconsistency detection component 145 may identify inconsistences between tags assigned to same tokens within a data set and may output these inconsistencies to a reviewer for rectifying and addressing the inconsistencies.

As described, tagging of data may include an annotation of words in a string of text to associate each of the words with a tag indicating a contextual meaning assigned to the word (e.g., association of information through the tags to content of the string or data set). For example, the words in the string of text may be referred to as tokens, where a tag for a token indicates a meaning for the token within a context of the string. Examples of tags for tokens may include "brand name," "color," "material," "person," "place," etc. Additionally, the tags may be part of a tag set defined for use with a particular data set (e.g., specific to the data set or to a range of data sets). For example, tags in a first tag set defined for a particular implementation (e.g., annotating data in news articles or on news websites) may be different than tags in a second tag set defined for a different implementation (e.g., annotating data for items for sale on an e-commerce site).

Annotations and tagging of data may provide a deeper understanding of content (e.g., a data set) for machine learning systems, and a system may take some actions based on that deeper understanding. For example, if the system identifies that "Apple" is a brand name and not a fruit or color, the system may not machine translate "Apple" into another language, such as for an item for sale on an e-commerce website). In some cases, the content to be annotated may include a string that is tokenized, and the work of annotation may include assigning tags to those tokens. A string may be a sentence, a query (e.g., on the e-commerce website), or a title for an item for sale (e.g., on the e-commerce website).

Once a string of content (e.g., the sentence, query, item title, etc.) is tagged, a quality check of the tag annotations may be performed. For example, a first person may assign the tags to the tokens of the string, and a second person may then review the tags for accuracy and quality (e.g., ensuring that annotations are accurate and consistent). Accordingly, the second person (e.g., a reviewer) may agree or disagree with the tagging and may propose a correction of a tag for a token. Rather than reviewing each tag for an entire data set (e.g., 2,000 strings with 10 tokens each, and one tag for each token, for a total of 20,000 tokens and 20,000 tags, as an example), the second person may choose a sample of strings to review, such that a percentage of the total strings would be reviewed. For example, for a data set of 2,000 strings, the second person may select and review a 5% sample set of the strings, resulting in 100 strings for review with 10 token per string for a total of 1,000 tokens individually reviewed. By reviewing the sample set of strings, the second person may provide a level of assurance about the quality of the annotation tags but may not look at the unreviewed 95% of content in the data set.

While using the sample set to review annotation tags in a data set may save time and effort for a reviewer, the amount of data may still be large, such that tagging errors or inconsistencies can be missed by the reviewer. Additionally, as noted previously, a majority of the data set may remain unreviewed, further increasing potential for tagging errors and inconsistencies. Since high-quality human annotation is a fundamental part for different implementations (e.g., Machine Learning applications, search queries and results, etc.), efficient and thorough quality assurance may be desired for reviewing annotation tags for a data set.

The system 100 may support techniques for enhancing or automating a review process of annotation tags for a set of tokens. A system may receive a list of tokens with associated tags for each token for a data set and may output any identified inconsistencies where a token is assigned at least two different tags. For example, instead of a human looking at each token individually or taking a sample set of the tags for review, the described techniques may look at all tokens with the associated tags in a set of data and may leverage reorganizing the tokens and associated tags to highlight possible errors to be fixed of tokens that have identified inconsistencies of at least two different assigned tags. Accordingly, the system may look across all tokens within an entire data set, while a review (e.g., by a human) of possible errors of the data set is limited to the tokens that have been identified with at least two different tags assigned.

Accordingly, the described techniques may ensure quality by reviewing annotation tags for strings of a data set and analyzing all strings and corresponding tags in the data set. For example, the techniques may look at the quality of annotated data (e.g., strings) in the data set beyond the review of an individual string, thereby achieving gains in quality on annotated data (e.g., NER data) compared to a human reviewing the annotated data (e.g., using a sample set or reviewing the entirety of the annotated data). Additionally, the techniques described herein may be applied to different kinds of annotated data.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure and, accordingly, do not represent all of the technical improvements provided within the scope of the claims.

Figure 2:
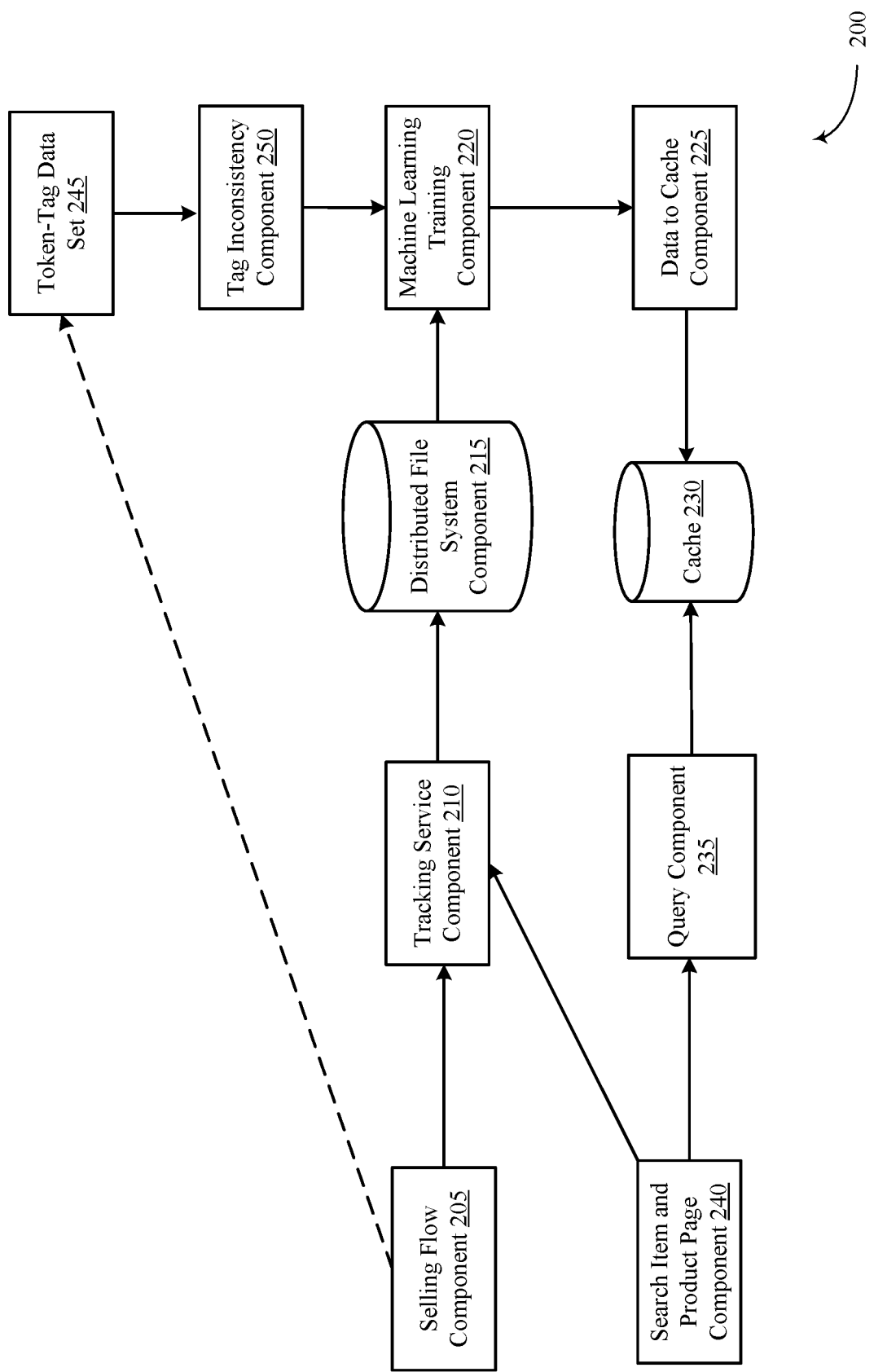
FIG. 2 illustrates an example of an application flow that supports improving the quality of human annotation in accordance with aspects of the present disclosure.

FIG. 2 illustrates an example of an application flow 200 that supports improving the quality of human annotation in accordance with aspects of the present disclosure. Components of the application flow 200 may include components of server system, such as server system 125 of the system 100, as described with reference to FIG. 1, or an application server 510, as described with reference to FIG. 5, for implementing an online marketplace. Some components of application flow 200 may be within or communicating with a data center, such as data center 120, or a cloud platform, such as cloud platform 115, or both. Application flow 200 may represent a number of components used to perform quality assurance of annotated tags for tokens of different strings within a data set.

Selling flow component 205 may interact with one or more users to generate listings from one or more users, or "sellers" that may intend to sell one or more items (e.g., products) via an online marketplace. The seller may be a user operating a user device, such as a user device 110 or a user device 505 as described with respect to FIGS. 1 and 5, respectively. The interaction with selling flow component 205 may prompt the seller to input a number of parameters describing the item to be listed for sale, such as a string that includes multiple tokens describing the item. In an example, the selling flow component 205 may cause the user device 110 to present a graphical user interface for generation of a listing. A seller may generate a listing of an item (e.g., product) for sale that includes a description of the product that constitutes a string made up of multiple words used to describe the product. For example, the string description of the product may be "Gucci Authentic Size 90 Pearl Marmont Belt" that describes the brand name for the product (e.g., "Gucci"), specifications of the product (e.g., "Size 90," "Pearl," etc.), a classifier for the product (e.g., "Marmont"), and the product itself (e.g., "Belt").

The selling flow component 205 may categorize the listing as for a particular product of a set of products available to purchase via the online marketplace. A listing may be mapped to a particular product based on the description of the product, where the items listed for sale have the same or similar characteristics but may permit some variation to exist between the items while still being mapped to the same product. In some cases, the seller generating the listing may select or recommend that the listing is for a particular product. The user-recommended product for the listing may be updated or changed by the selling flow component 205 or a machine learning training component 220.

In some implementations, an annotator (e.g., a first person) may access the selling flow component 205 to generate a token-tag data set 245 using the descriptions for each of the products listed for sale. For example, for a set of products, the annotator may select each product description and parse the product descriptions to identify tokens in the product descriptions for annotation tagging, as described herein. That is, the annotator may break up the product description into the individual words that make up the product description, where each of the individual words may be referenced as a token. The annotator may then assign a tag to each token to associate the token with a contextual meaning for that token within a context for the set of products. For example, with the example product description noted previously (e.g., "Gucci Authentic Size 90 Pearl Marmont Belt"), the annotator may assign a "Brand Name" tag to the token "Gucci" and a "Material" tag to the "Pearl" token (e.g., indicating the belt listed for sale includes pearls on the belt). By performing this annotation tagging for each product of a set of products, the annotator may generate the token-tag data set 245.

Subsequently, as described herein, the token-tag data set 245 may be fed into a tag inconsistency component 250. Ensuring the quality of the tags assigned in the token-tag data set 245 may be important for different implementations (e.g., returning search queries, determining accurate machine learning algorithms, etc.), such that the tag inconsistency component 250 is used to identify possible tagging errors or inconsistencies for tokens in the token-tag data set 245. For example, the tag inconsistency component 250 may identify and output instances where a same token (e.g., "Gucci") is assigned at least two different tags (e.g., "Brand Name" for a first instance of "Gucci" and "Material" for a second instance of "Gucci").

In some implementations, the tag inconsistency component 250 may first turn the token-tag data set 245 into a list of token-tag pairs. Subsequently, the tag inconsistency component 250 may sort the list of token-tag pairs by token and then by tag to create a secondary list that can highlight inconsistencies of tags for the same tokens. Inconsistent tagging may be an indication that multiple different contextual meanings within the context of the set of products have been assigned to a same token. Previously, spotting a tagging error for a token among the entire token-tag data set 245 by a human reviewer may be a challenge, but sorting the list of token-tag pairs by token and then by tag may more easily identify the inconsistencies between tags for a same token. Additionally or alternatively, the tag inconsistency component 250 may filter the list of token-tag pairs by tag to produce a focused list of tokens that have a tag in common. Through this filtered list, a token that does not belong with the rest of the tokens for that tag may be more easily identified.

Additionally, the tag inconsistency component 250 may identify and extract additional information about the list of token-tag pairs. For example, the tag inconsistency component 250 may identify a frequency of occurrence of a tag for a token for each token-tag pair. The frequency of occurrence for a tag may reveal tokens that can have more than one valid tag (e.g., "Pearl" can be both a material and a color). Tokens that can have more than one valid tag may be referred to as a polysemous token. The frequency of occurrence of a tag for a token may highlight the polysemous tokens and the most frequent assigned tags for that polysemous token, resulting in easier identification of tag inconsistencies and possible tagging errors. For example, tagging errors may have lower frequencies of occurrence (e.g., occur less often), enabling the reviewer to more efficiently check these potential tagging errors. Additionally or alternatively, the tag inconsistency component 250 may identify additional frequency of occurrence data indicating a number of times (e.g., how often) a token is assigned or appears for a particular tag to indicate the number of times each character string appears for a tag, enabling potential identification of potential tagging errors (e.g., less often occurring tokens for a tag may be wrongly tagged).

In some implementations, some of the tags being tagged may have lists of values available that can be used for quality checks. For example, "Brand Name" may be a tag for which an e-commerce company has their own data (e.g., particular tokens that should have the tag "Brand Name") and for which organizations such as the World Intellectual Property Organization (WIPO) also have data. This list of available values may be used for quality checks for that tag to ensure tokens with that tag assigned are in the corresponding values or data. Additionally, data (e.g., different character strings/tokens) previously tagged may be available for use in the quality checks. For example, a first batch of tags may be used for quality checks if a second batch of tags are being reviewed, or data tagged for a different category of items that is similar to the category to be tagged and reviewed may be used. The tag inconsistency component 250 may check tokens and spans against the history of that same token or span being tagged before, and the tag inconsistency component 250 may compare a current tag with the history to identify potential tagging errors and inconsistencies. Additionally, guidelines for tagging may be created, or, when defining tags in a taxonomy system, different values that are to receive tags may be defined. The tag inconsistency component 250 may then use these guidelines and defined tags to check tags of tokens to identify potential tagging errors or inconsistencies.

Additionally or alternatively, the tag inconsistency component 250 may provide suggestions of tags for annotating data. For example, the system may pre-tag or provide tag suggestion for data based on available historical or external data. As an example, a list of predefined tags of "Brand Name" may contain a token "Blue Buffalo," and the system may pre-tag each occurrence of the span "Blue Buffalo" as a "Brand Name" to avoid the risk of wrong tagging by the annotator. In some cases, a current token may include a history and a tag. The tag inconsistency component 250 (e.g., annotation tool) may then leverage that token and suggest the tag used before for that token as a possible tag. For example, the tag inconsistency component 250 may identify a token of "Blue" and suggest a tag of "Color" or a tag of "Brand Name" if the "Blue" is part of the span "Blue Buffalo." Accordingly, a memory suggestion may reduce the risk of improperly tagging a token, increasing quality and efficiency.

The tag inconsistency component 250 may then present the identified inconsistencies (e.g., and tag suggestions) to the reviewer in a condensed report to prevent the reviewer from checking the entire token-tag data set 245. For example, the tag inconsistency component 250 may identify a frequency of occurrence of a tag for a token for each token-tag pair and present this information to the reviewer. The reviewer (e.g., a same person as the annotator or a second person) may then review the output of the tag inconsistency component 250 and may correct any tagging errors identified. For example, instead of the reviewer (e.g., a human) looking at each token individually or taking a sample set of the tags for review, the tag inconsistency component 250 may look at all tokens with their associated tags in the token-tag data set 245 and may leverage reorganizing the tokens and associated tags to highlight possible errors to be fixed by the reviewer, where the possible errors include tokens that have identified inconsistencies of at least two different assigned tags. Accordingly, the system may look across all tokens within an entire data set (e.g., token-tag data set 245), while a review (e.g., by the reviewer) of possible errors of the data set is limited to the tokens that have been identified with at least two different assigned tags or tag suggestions by the tag inconsistency component 250.

The described techniques may also be applied to spans of tokens. For example, the spans of tokens may include multiple words—that form a single unit of meaning, such as a proper name (e.g., a span of "Blue Buffalo" may be treated as one span of tokens with a tag of "Brand Name").

In some examples, after revising the token-tag data set 245 through the tag inconsistency component 250, the reviewer or the tag inconsistency component 250 may input an updated token-tag data set (e.g., revised token-tag data set) to a machine learning training component 220. The machine learning training component 220 may then determine or train machine learning algorithms based on the updated token-tag data set to associate different tokens with corresponding tags. In one example, the machine learning training component 220 may execute a machine learning algorithm (e.g., neural network algorithm) to identify possible tag values for different tokens. An example of the machine learning algorithm used to classify tags for tokens may be a neural network, such as a pointer generator network.

Using the updated token-tag data set as the training data, the machine learning training component 220 may use verified or correct tags for different tokens to then perform different implementations. For example, if a description for a product is translated into different languages (e.g., for different countries or users that use different languages than those originally used to describe the product), the machine learning training component 220 may refrain from (e.g., or indicate to a translation component to refrain from) translating certain parts of the product description into a target language, such as not translating proper nouns or a brand name for the product (e.g., "Gucci" may not be translated between languages). Additionally or alternatively, the machine learning training component 220 may generate more accurate search results for a search query by using the updated token-tag list to produce search results that better capture products a user is searching for with a particular search query. For example, the search query may include different features for a product to narrow search results, such as a color or material for the product, and the machine learning training component 220 may use the updated token-tag list to identify corresponding products with those included features to return higher quality search results.

Additionally, up to each listing uploaded by one or more sellers may be tracked by a tracking service component 210. The tracking service component 210 may forward the listing and corresponding description for the product listing for storage in a distributed file system component 215. The tracking service component 210 may monitor buyer behavior when viewing one or more listings in one or more search results pages. Examples of search results pages including listings that may be monitored are also discussed with reference to FIG. 4. The tracking service component 210 may monitor a listing presented in a search results page for purchases, as well as monitor user interaction with the product listing and communicate user behavior data to a distributed file system component 215. Distributed file system component 215 may be an example of a HADOOP application. Distributed file system component 215 may use a network of multiple computers to analyze large amounts of data. Distributed file system component 215 may monitor and analyze sales throughout the online application as well as analyze sales based on user behavior data as detected by the tracking service component 210. The machine learning training component 220 may continually classify token-tag relationships received through the token-tag data set(s) 245 from selling flow component 205.

Once token-tag relationships are determined, the machine learning training component 220 may forward the updated token-tag data set and determined token-tag relationships and identifications of corresponding products to a data to cache component 225 using a workflow management platform (e.g., Apache Airflow). The data to cache component 225 may be an example of a cache layer, such as a memory cache (e.g., memcache) or a non-structed query language (non-SQL or NOSQL) database. The data to cache component 225 may provide the listings with the corresponding product descriptions in the listings with the token-tag annotations for storage in a cache 230. In some cases, the listings with the product descriptions and token-tag annotations may be stored in cache 230.

When a buyer user device (e.g., user device 110) uses an online application (e.g., in an online marketplace) to transmit a search query for an item listed for sale in the online marketplace, a query component 235 may implement a service (e.g., representational state transfer (REST) service) to respond to the query. The query component 235 may query the cache 230 using the search query to identify a particular product of a set of available products and one or more listings that match the search query. In some cases, the cache 230 may return product listings that match the search query. Additionally, the queries submitted by the buyer user device through the query component 235 may include different features or limitations for the queried item to narrow or refine specifics for the item such that more desirable search results are returned by the cache for the search query. Accordingly, the cache 230 may use token-tag relationships or annotations supplied by the machine learning training component 220 to find product listings that more closely reflect products indicated by the search query.

The search query results, including listings and product descriptions returned by cache 230, may be displayed by a search item and product page component 240. The cache 230 may return listings with similar features indicated in the search query by identifying any tokens in the search query, associating corresponding tags to those tokens, and then searching through the token-tag relationships of the listings within the cache 230 (e.g., using the update token-tag data set) to find matching or similar token-tag pairs to generate the search results. Thus, based on the classification of token-tag relationships performed by the model trained by the token-tag data set 245 through the machine learning training component 220, higher quality search results may be generated for a search query that more accurately capture features requested for a product through the search query (e.g., search limitations). For example, if the search query includes "Gucci belt with pearls," the cache 230 may return the example product listing described previously (e.g., "Gucci Authentic Size 90 Pearl Marmont Belt") as a top search result based on similar tokens included in both the search query and product listing and those similar tokens having same tags.

As the prospective buyer interacts with the search results page as part of the search item and product page component 240, the tracking service component 210 may coordinate with the search item and product page component 240 to monitor the behavior of the prospective buyer to update the one or more user behavior data stored in the distributed file system component 215. The tracking serve component 210 may aid in facilitating a purchase of a product by a user operating a user device 110 that entered the search query into query component 235.

Figure 3:
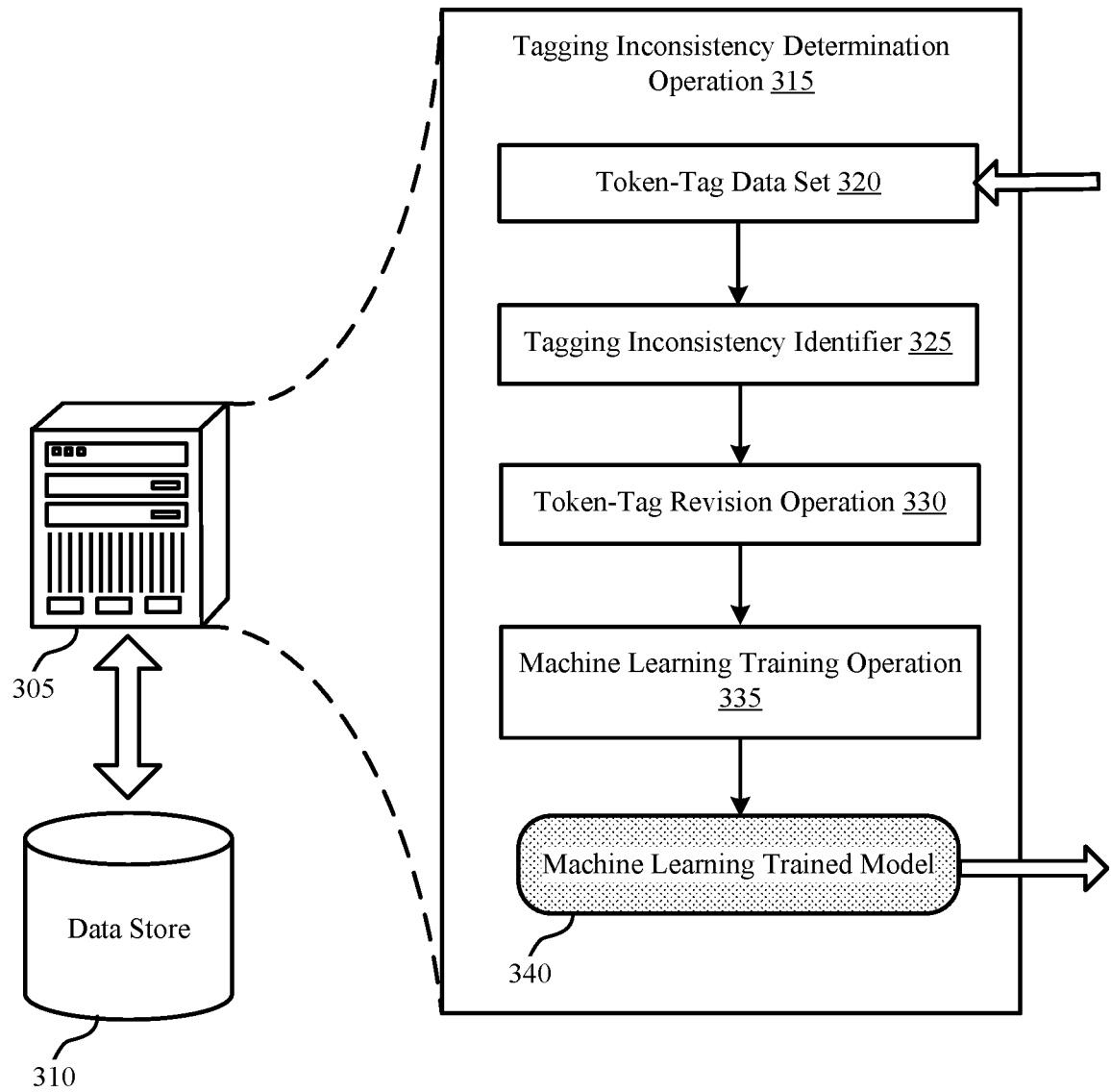
FIG. 3 illustrates an example of a system that supports improving the quality of human annotation in accordance with aspects of the present disclosure.

FIG. 3 illustrates an example of a system 300 that supports improving the quality of human annotation in accordance with aspects of the present disclosure. The system 300 may include a device 305 (e.g., an application server or server system) and a data store 310. In some cases, the functions performed by the device 305 (such as application server) may instead be performed by a component of the data store 310. A user device (not shown) may support an application for online marketplace. Specifically, a user device in combination with the device 305 may support an online marketplace that generates search results or tag suggestions using machine learning models by leveraging token-tag pair annotations. An application (or an application hosting the online marketplace) may train a mathematical model (e.g., artificial intelligence model) at the device 305, where the device 305 may identify a machine learning trained model 340 based on training data and using the trained data to generate token-tag relationships for different listings in the data store 310. In some examples, the device 305 may provide the machine learning trained model 340 to an additional device (not shown).

According to one or more aspects of the present disclosure, a buyer may use a user device to provide a search query and receive one or more search results. Specifically, the user device may display an interactive interface for displaying an online marketplace and displaying one or more search results. In some examples, the user device may be a mobile device. Additionally, a seller may use a user device to upload a listing for a product. In some cases, the interface at the user device may run as a webpage within a web browser (e.g., as a software as a service (SaaS) product). In other cases, the interface may be part of an application downloaded onto the user device. A user (seller and/or buyer) operating the user device may input information into the user interface to log on to the online marketplace. In some cases, a user may be associated with a user credential or user ID, and the user may log on to the online marketplace using the user credential.

In some cases, the device 305 may train or develop a mathematical model (e.g., artificial intelligence model, a machine learning model, a neural network model etc.) to identify accurate and consistent tags for different tokens associated with listings for products in the data store 310. For example, the mathematical model may identify tags corresponding to identified tokens to improve search results. In an example, using the mathematical model, if a machine learning algorithm identifies that the token "Apple" in a search query is a brand name and not a fruit, the device 305 may return search results corresponding to the brand name and may omit search results corresponding to the fruit. Thus, the techniques may be used to enhance annotation of tokens with tags and may be used to improve annotation of token-tag pairs for training of a machine learning model.

As part of training and developing the mathematical model, the device 305 may perform a tagging inconsistency determination operation 315 as part of identifying accurate and consistent tags for different tokens in the data store 310. Initially, the device 305 may receive a token-tag data set 320 (e.g., similar to the token-tag data set 245 described with reference to FIG. 2) that includes a set of tokens for multiple listings for products in the data store 310 and a corresponding set of tags for the set of tokens, where the set of tags have been assigned by an annotator (e.g., manually by a human, automatically by a machine learning component, or both). In some cases, not all tokens in the data store 310 may have an assigned tag. For example, if a product description for a listing includes superfluous tokens or words (e.g., such as articles like "the" or descriptors that do not use tags like "authentic" or "new"), those extra tokens and words may not be assigned tags. Accordingly, the token-tag data set 320 may include tokens from the data store 310 that have been assigned tags and may omit tokens or words in the data store 310 that do not have tags assigned. Additionally or alternatively, the token-tag data set 320 may include all tokens and words from the data store 310 whether each token has a tag assigned or not (e.g., to determine whether a token was mistakenly not tagged).

After receiving the token-tag data set 320, the device 305 may then use a tagging inconsistency identifier 325 as part of the tagging inconsistency determination operation 315. As described with reference to FIG. 2 with the tag inconsistency component 250, the tagging inconsistency identifier 325 may identify instances where a same token in the token-tag data set 320 is assigned two or more different tags, indicating a possible tagging error. For example, the tagging inconsistency identifier 325 may use different sorted lists of token-tag pairs in the token-tag data set 320 (e.g., sorted by token, sorted by tag, or a combination thereof), frequency occurrences of the tags per token or the tokens per tag or both, defined values for the tokens and tags, historical tagging data, or a combination thereof to indicate inconsistently tagged tokens and possible tagging errors.

Subsequently, after identifying any inconsistently tagged tokens and possible tagging errors through the tagging inconsistency identifier 325, the device 305 may then perform a token-tag revision operation 330 as part of the tagging inconsistency determination operation 315. For example, during the token-tag revision operation 330, the device 305 may output the inconsistently tagged tokens and possible tagging errors to a user device for a reviewer to determine whether the inconsistently tagged tokens are mis-tagged or not. Accordingly, the reviewer may then update the token-tag data set 320 with correct tags for any mis-tagged tokens to generate a revised (e.g., updated) token-tag data set. Additionally, in some implementations, the device 305 may supply suggested tags for the inconsistently tagged tokens to enable the reviewer to more efficiently update the token-tag data set 320.

The device 305 may then input the revised token-tag list to a machine learning training operation 335 for the tagging inconsistency determination operation 315. The machine learning training operation 335 may use the revised token-tag list to identify accurate and consistent tags for different tokens. These accurate and consistent tags may then be used to generate and train the machine learning trained model 340. For example, the machine learning trained model 340 may be used to perform search functions for an online marketplace (e.g., an e-commerce company), a search engine, etc. Subsequently, the machine learning trained model 340 may identify tokens in search queries submitted by a user and determine corresponding tags for those tokens based on the revised token-tag list and machine learning training operation 335 to produce higher quality and more accurate search results for the search queries. Additionally, the machine learning trained model 340 may be used for additional implementation that leverage token-tag annotations, such as machine translation. In some implementations, the machine learning trained model 340 may also be used to pre-tag tokens in the data store 310 (e.g., for new listings and product descriptions submitted to the data store 310), where tokens are automatically assigned tags or have tags suggested for them based on the machine learning trained model 340.

Figure 4A:
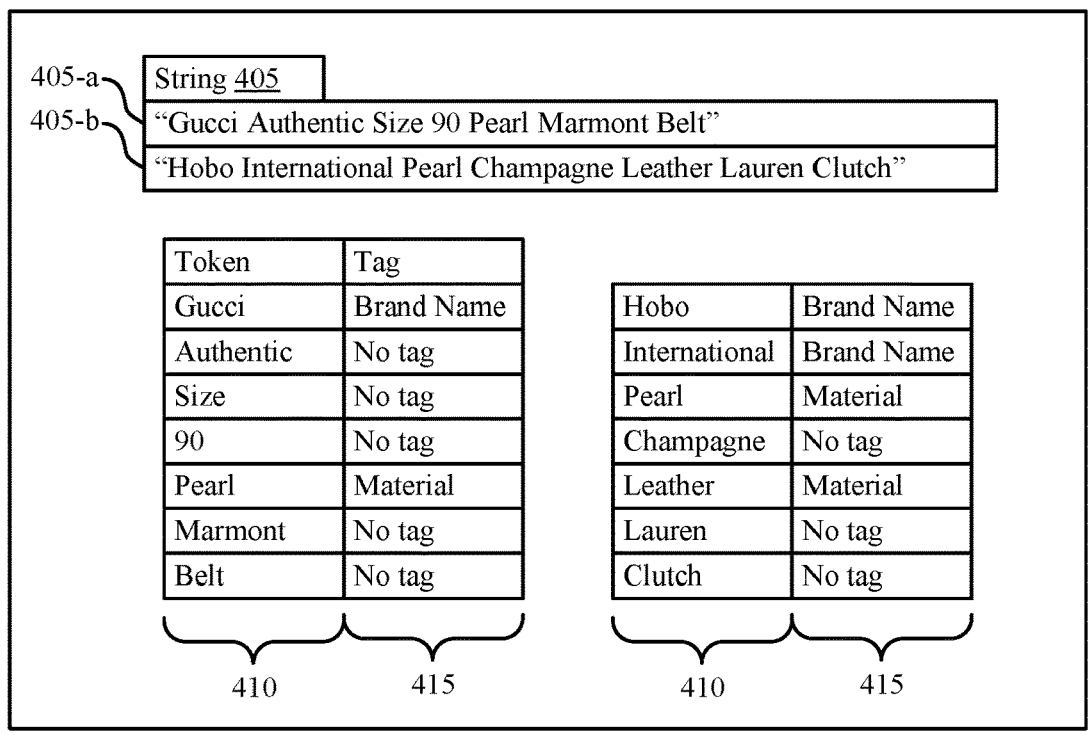
FIGS. 4A-4B illustrates an example of a user interface that supports improving the quality of human annotation in accordance with aspects of the present disclosure.
Figure 4B:
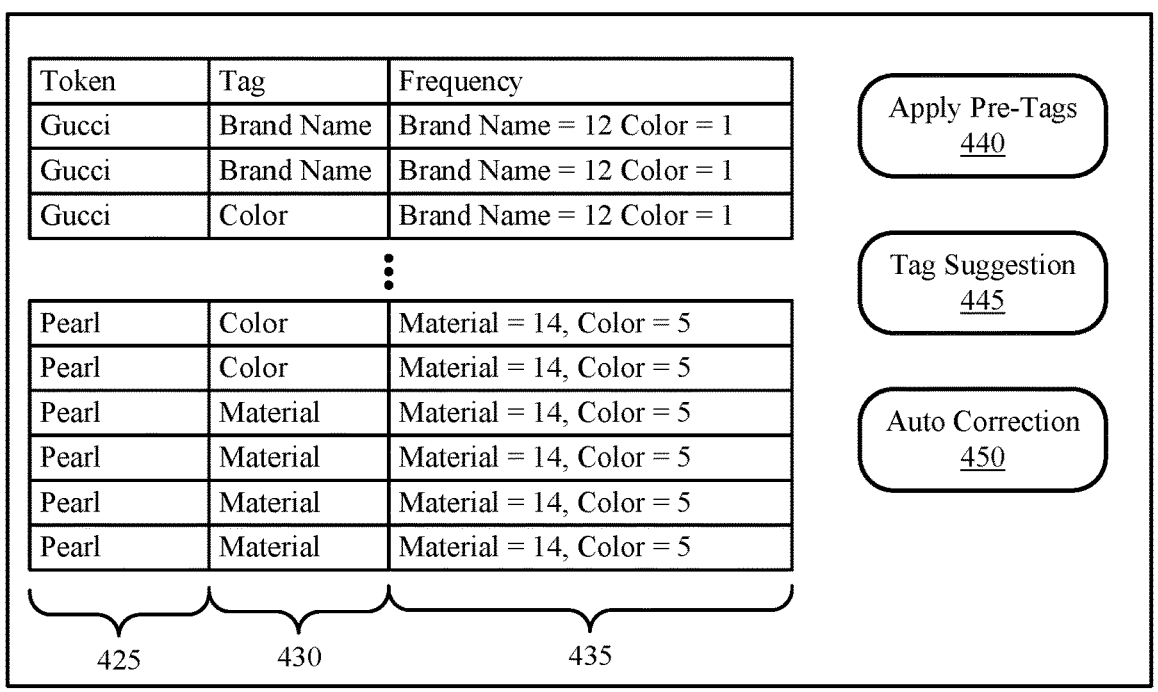

FIGS. 4A and 4B illustrate examples of user interfaces 400 and 401 that support improving the quality of human annotation in accordance with aspects of the present disclosure. User interfaces 400 and 401 may implement aspects of system 100, application flow 200, and system 300. For example, a user device as described with reference to FIGS. 1-3 may include user interfaces 400 and 401 for users that are annotating or reviewing or both for multiple strings 405 of a data set. Accordingly, the user interfaces 400 and 401 may enable increased quality of human annotation. Instead of looking at each string 405 individually, the user interfaces 400 and 401 may be used to look at all tokens for every string 405 in the data set to leverage reorganizing the tokens to highlight possible errors to be fixed. By looking at all tokens for every string 405 in the data set, the user interface 400 and 401 may be used to look at slices across the entire data set, rather than reviewing a sample of the data set that is limited to the tokens that are in that sample, thereby providing added confidence of accurate and consistent tagging across the data set For user interface 400, two example strings 405 are shown that include one or more tokens 410 and corresponding tags 415 assigned to each token 410 in the strings 405. A first string 405-a may include the example string described previously for a first product, "Gucci Authentic Size 90 Pearl Marmont Belt," and a second string 405-b may include an example string describing a second product, "Hobo International Pearl Champagne Leather Lauren Clutch."

Subsequently, a first user (e.g., an annotator) may use user interface 400 to break out each string 405 into the component tokens 410 that make up each string 405 for then assigning tags 415 for each token 410. For example, the first string 405-a may be broken out into the separate tokens "Gucci," "Authentic," "Size," "90," "Pearl," "Marmont," and "Belt." Similarly, the second string 405-b may be broken out into the separate tokens "Hobo," "International," "Pearl," "Champagne," "Leather," "Lauren," and "Clutch." The first user may then assign tags 415 to the appropriate tokens 410. For example, the first user may assign a "Brand Name" tag to "Gucci" for the first string 405-a and to "Hobo" and "International" for the second string 405-b (e.g., "Hobo International" may be treated as a span, where both words/tokens are treated as a single entity constituting a "Brand Name" for the second string 405-b). Additionally, the first user may assign a "Material" tag to the "Pearl" tokens in both the first string 405-a and the second string 405-b and to the "Leather" token in the second string 405-b. The rest of the tokens in both strings 405 may not include assigned tags or a tag indicating no tags are assigned to the corresponding tokens (e.g., "No tag"). The first user may assign tags 415 for each token 410 of each string 405 in the data set.

Accordingly, the strings 405 may be turned into a list of token-tag pairs based on the assigned tags 415 for each token 410 as shown in the user interface 400 and below in Tables 1 and 2.

TABLE 1

Token-Tag Pairs for the First String 405-a

| Token | Tag |
|---|---|
| Gucci | Brand Name |
| Authentic | No tag |
| Size | No tag |
| 90 | No tag |
| Pearl | Material |
| Marmont | No tag |
| Belt | No tag |

TABLE 2

Token-Tag Pairs for the Second String 405-b

| Token | Tag |
|---|---|
| Hobo | Brand Name |
| International | Brand Name |
| Pearl | Material |
| Champagne | No tag |
| Leather | Material |
| Lauren | No tag |
| Clutch | No tag |

By turning the strings 405 into the lists of token-tag pairs, the entire data set of strings with tokens and tags may then become a collection of token-tag pairs. These token-tag pairs may then be manipulated as needed by a second user (e.g., a reviewer, which may be a same person as the annotator/first user or a different person) to facilitate quality checks on the assigned tags as described herein.

The user interface 401 may represent a user interface that can be used by the second user for identifying and checking tagging inconsistencies for a same token and potential tagging errors. For example, the second user may sort a complete list of token-tag pairs by the tokens 410 and then by the tags 415 to create a list that highlights tagging inconsistencies for each token. That is, each time that a same token is tagged with a different tag, a potential inconsistency may be displayed to the second user. Table 3 below may illustrate an example display seen by the second user.

TABLE 3

Example Display for Highlighting Tagging Inconsistencies

| Token | Tag |
|---|---|
| Gucci | Brand Name |
| Gucci | Brand Name |
| Gucci | Brand Name |
| Gucci | Brand Name |
| Gucci | Brand Name |
| Gucci | Color |
| Hobo | Brand Name |

Based on Table 3, the second user may identify that "Gucci" was changed from being tagged as a "Brand Name" to being tagged as a "Color." Since "Gucci" is a "Brand Name" and not a "Color," the second user may determine the "Color" tag is a tagging error for the corresponding instance of "Gucci" and may update the tag to "Brand Name." This tagging error may become easier to identify when presented through this sorted table rather than attempting to spot the tagging error in the entire data set by hand (e.g., reviewing 10,000+ tokens), where the tokens 410 and tags 415 are mixed with other tokens 410 in a string 405 rather than grouped with same tokens.

Additionally, the identification of tagging inconsistencies and possible tagging errors may be further refined by including additional information with the identified tagging inconsistencies. For example, a frequency of occurrence may be generated and displayed via the user interface 401 for the second user to use as part of reviewing the tag annotations. The frequency of occurrence may indicate a number of times a tag is assigned to a token across the entire data set. Table 4 below may represent an example display seen by the second user that includes frequency of occurrence data.

TABLE 4

Example Display for Highlighting Tagging Inconsistencies with Frequency of Occurrence Data

| Token | Tag | Frequency |
|---|---|---|
| Gucci | Brand Name | |
| Pearl | Color | Material = 13, Color = 4 |
| Hobo | Brand Name | |
| International | Brand Name | |
| Pearl | Color | Material = 13, Color = 4 |
| Champagne | Color | |
| Leather | Material | |

When looking at the data presented in the format of Table 4 with the frequency of occurrence data, the second user may more easily spot any potential tagging errors and tagging inconsistencies. For example, the second user may identify that "Pearl" can be a "Color" or a "Material." Informed by that, the second user may then look into the actual products corresponding to the strings 405 that include "Pearl" to identify whether the "Pearl" refers to a "Color" of the corresponding product or a "Material" for the product. Subsequently, the second user may then appropriately update any tags for "Pearl" as needed. This check using the frequency of occurrence data may enable finding inconsistencies and improving the quality of tagging.

Additionally, by using the frequency of occurrence data when checking and verifying tags, tokens that can have more than one valid tag may be identified, such as "Pearl" can be both a "Material" and a "Color." Tokens that can have more than one valid tag may be referred to as polysemous tokens. The first user (e.g., the annotator) may have been annotating or tagging "Pearl" more often as a "Material" than as a "Color." As such, the first user may pick a "popular choice" (e.g., which tag has been used more often) when tagging the token without researching the actual product or item, possibly resulting in tagging errors. Performing this tagging inconsistency check with the frequency of occurrence data may highlight polysemous tokens and the most frequent tags for that token, thereby enabling the second user to more easily to identify this type of error.

As shown with reference to user interface 401, the tokens 410 and the tags 415 assigned in user interface 400 may be sorted by token and then tag to produce a sorted token list 425 and a sorted tag list 430 per token. Accordingly, the second user may identify that "Gucci" has been assigned tags of "Brand Name" and "Color" and that "Pearl" has been assigned tags "Color" and "Material" by looking at the user interface 401. The second user may identify that the "Color" tag for "Gucci" was most likely made in error based on "Gucci" being a "Brand Name," but "Pearl" can either be a "Color" or "Material."

To potentially help the second user identify which tags are correct or not, the user interface 401 may also include frequency data 435 for each token 410 in the sorted token list 425 indicating the number of times a tag 415 has been assigned to the token 410. For "Gucci," if the second user did not identify that "Color" was a wrong tag initially, the frequency data 435 may further confirm that "Color" was improperly tagged for "Gucci" based on only one occurrence of "Gucci" including the "Color" tag (e.g., 12 instances of "Gucci" were tagged with "Brand Name" as opposed to one (1) occurrence of the "Color" tag). That is, lower occurring tags for a tag may represent tagging errors.

Additionally, for "Pearl," the frequency data 435 may indicate that for a majority of instances of "Pearl" the tag for "Material" was used (e.g., 14 times) as opposed to the tag for "Color" (e.g., five (5) times) Rather than instantly changing the tags for "Pearl" like the second user may do for changing the "Color" tag for "Gucci," the second user may investigate further for each "Color" tag for a "Pearl" token to identify which tag to assign. As such, the second user may still perform a more efficient quality check by looking at the five (5) "Color" tags for the "Pearl" token instead of every "Pearl" token instance.

Additionally or alternatively, because the data set is organized as a list of tokens and tags (e.g., token-tag pairs), the user interface 401 or the second user or both may filter the data set by the tags 415 first and then by token 410 to yield a list of tokens arranged by tag. For example, the list of token-tag pairs may become a focused list of tokens that have something in common (e.g., a common tag 415). Table 5 below may represent an example display seen by the second user with different tokens that have been assigned the "Material" tag.

TABLE 5

Example Display for Highlighting Tagging Inconsistencies by Tag

| Token | Tag |
| --- | --- |
| Bamboo | Material |
| Canvas | Material |
| Chiffon | Material |
| Denim | Material |
| Fabric | Material |
| Faux | Material |
| Felt | Material |
| Foam | Material |
| Glass | Material |
| Guccissima | Material |
| Leather | Material |

By looking at Table 5 with a mindset of "Materials," the second user may identify that "Guccissima" stands out as not being a "Material" and different from the rest of the tokens. Accordingly, the second user may identify that tagging "Guccissima" with the "Material" tag may be a tagging error. Subsequently, the second user may then look into the actual item title (e.g., and image) for the corresponding product with "Guccissima" in the title, listing, product description, etc. (e.g., string 405). The second user may then identify that the material for the corresponding product has already been tagged and that "Guccissima" was incorrectly tagged. For example, a string 405 for the corresponding product may be "New Gucci 325806 Wool Black Reversible GG Guccissima Red Green Stripe Scarf," and the second user may identify the material for the product is "Wool" and, as such, may remove the "Material" tag for "Guccissima."

In some implementations, the frequency of occurrence data may also be used when sorting and displaying the token-tag pairs by tag first. For example, by adding the frequency of occurrence data, the second user may identify additional indication of errors as tagging errors may tend to have lower frequencies. Table 6 below may represent an example display seen by the second user for frequencies of different "Materials."

TABLE 6

Example Display for Highlighting Tagging Inconsistencies with Frequency Data

| Token | Frequency |
| --- | --- |
| Canvas Count | 11 |
| Chiffon Count | 10 |
| Cotton Count | 10 |
| Crystal Count | 26 |
| Fur Count | 15 |
| Guccissima Count | 3 |
| leather Count | 188 |

As such, by looking at the token-tag pairs with the frequency of occurrence for each token per tag, the second user may easily identify any outliers that should not be included for that tag. For example, since "Guccissima" has a relatively low frequency of occurrence (e.g., three (3) occurrences) as compared with the other types of "Material," the second user may identify "Guccissima" has been improperly tagged as a "Material."

The described techniques may also be applied to spans. A span may be a combination of more than one token tagged together as a unit of meaning. For example, "Blue Buffalo" may be a "Brand Name" that contains two tokens. In some cases, spans may have a much more defined meaning as opposed to single tokens, so less polysemy errors may arise. The token "Blue" alone, besides being a "Color," may appear as a "Brand Name" or product line, but "Blue Buffalo" may only be a "Brand Name." However, if "Blue Buffalo" is not tagged, the checks described above will discover that error.

Each token in a span may receive the tag assigned to the span as a whole. For example, "Blue Buffalo" may be broken into two tokens, "Blue" and "Buffalo," and both tokens may have a same tag "Brand Name." The checks above are then performed at the token level. Additionally or alternatively, all spans in the data set may be collected in a list of spans. This list may then be used in the same way that a list of token-tag pairs is used. That is, "Blue Buffalo" may be checked to see if there are other instances of "Blue Buffalo" that are not tagged or tagged differently than "Brand Name."

Additionally, an additional check may be performed with this data set to check if a span (e.g., "Blue Buffalo") may not have been tagged as a span. Therefore, the techniques described herein may enable the second user to perform a check that verifies spans versus individual tokens. For example, a token "Blue" may have been tagged as a "Color," and "Buffalo" may have been tagged as "No Tag. To identify this error, each span may be separated into individual tokens, and an n-gram (e.g., individual token or word of a span) may be searched in the token list. If the n-gram is found, the system (e.g., or the second user) may check if the tags match the tag used for the overall span, and if they are not, the user interface 401 may report this inconsistency as a potential error. Subsequently, if a first token of a span is found, the system may check if a next token of the span is also found and continue until all tokens of the span are found. Then, the system may check if all tags for each individual token match the tag used in the span. For example, the system may find a first token "Blue" and check if the next tag is "Buffalo" for the span of "Blue Buffalo." Once both tokens are found, the system may check if the tags for both "Blue" and "Buffalo" are "Brand Name." These techniques may apply to "Hobo International" for the second string 405-b, where "Hobo International" is a single span token with a tag of "Brand Name" indicated by "Hobo International" having the "Brand Name" tag or both "Hobo" and "International" both having "Brand Name" tags.

In some cases, some of the tags being tagged may have lists of values available that can be used for quality checks. For example, "Brand Name" may be a tag for which an e-commerce company would have their own data, and organizations such as WIPO may also have data for different tokens that should be tagged with "Brand Name." Subsequently, the system may use these lists of values for quality checks for that tag. For example, spans and tokens may be checked against these lists to confirm that a token/span tagged with "Brand Name" is in the lists and may report potential non-brands. For example, "Brand New" in "Brand New Oakley Sunglasses" may not indicate a brand for the corresponding product. Additionally or alternatively, spans and tokens may be checked against these lists by taking the n-gram from the data set and checking if they are in the lists (e.g., if individual tokens of a span are in the lists). If the n-grams are in the lists, the system may check if the corresponding tokens have been tagged as expected. For example, the bi-gram (e.g., two word/one span) "Blue Buffalo" may match a brand in the brand names list. Accordingly, if "Blue Buffalo" has not been tagged as "Brand Name" (e.g., either as a span or as individual tokens), the system may report a potential tagging error.

Additionally, data that was previously tagged may be available for checking the quality of tags for tokens. For example, a first batch of token-tag pairs may be used to perform a quality check of a second batch of token-tag pairs for a same set of data, or data tagged for a different category of items that is similar to the category of items to be tagged may be used for the quality check. For example, cell phones may have been tagged for a first set of token-tag pairs, and that first set of token-tag pairs may be used for checking token-tag pairs of cell phone accessories. Since the two categories are similar, many "Brand Name" tags and tokens as well as other tagged data may overlap. This correlation data may be used for quality checks on a current category. Accordingly, tokens and spans may be checked against a history of that same token or span being tagged before, and the current tag may be compared with the history. This correlation and historical data may be used as a post-annotation check, thereby not introducing any bias when assigning the tags to tokens during annotation because the historical data is not seen or used during annotation (e.g., only used after annotation as part of a quality check).

In some implementations, guidelines may be created for tagging or when defining tags in a taxonomy system. These guidelines may represent different examples of values or tokens that are to receive certain tags. A check to verify that these examples and their corresponding tags were used in the tagging of the tokens in the data set may represent a limited but reliable quality check. For example, these examples and guidelines may be intended to be solid cases of a source of truth. By checking token-tag pairs against guideline examples, outside data may be used during annotation to increase quality. In some cases, using suggestions of tags for annotating data may introduce biases into the behavior of the annotator. However, suggestions for tags may improve quality and consistency resulting from these suggestions, which may outweigh losses in quality due to possible bias. For example, user interface 401 may include different actions that the second user can use as part of a quality check for token-tag pairs in the data set, such as an apply pre-tags 440, a tag suggestion 445, or an auto correction 450, which may apply or correct tags based on different guidelines as described herein or suggest tags for the second user to use based on the guidelines, historical data, etc.

Additionally, the system described herein may support ensuring quality as the first user tags tokens in the data set. For example, the system may use additional data as part of the annotation task to increase tagging quality. In one example, the first user may use a similar operation as the tag suggestion 445 for suggestions of tags when annotating data. Additionally or alternatively, the first user may also use a similar operation as the apply pre-tags 440. If historical or external data is available, tokens in the data set may be pre-tagged based on the historical or external data. For example, a list of "Brand Names" may contain the token "Blue Buffalo," and, as such, the system may pre-tag each occurrence of this span of "Blue Buffalo" with "Brand Name" to avoid a risk of wrong tagging. Accordingly, many brands (e.g., including lesser known ones) may be pre-tagged using previous data, and research may be done before tagging to find out which tokens are brands to then leverage through pre-tagging. For example, "Wicked Lasers" may be a brand of flashlights, where this initial indication that any occurrences of "Wicked Lasers" might be a brand could direct a research to find the website of the company.

In some implementations, a memory may also be used when tagging different tokens in a data set (e.g., via a tagging tool). For translations, a tool may store all translations made before in a "memory," and the tool brings up a suggestion from that memory if a current string to be translated includes that sentence (or a very similar one) in the memory. For annotations, a current token may include a history and a tag. As such, an annotation tool may leverage that token and suggest the tag used before as a possible tag. Additionally, the suggestion may be extended to spans, such as "Blue" could appear in the annotation tool suggested as: "Blue—Color" or "Blue Buffalo—Brand Name." In some cases, variations of tokens or spans may appear as "fuzzy" (similar) matches, and the annotator may use this approximate match across variations as a reference for the annotation work.

Additionally, the memory may be expanded upon for annotation tagging. Using existing data and pre-tagging may rely on static, pre-existing data. An annotation tool with a memory may learn from data being tagged as the annotation is applied. For example, if an annotator tags a first instance of "Blue Buffalo" as a "Brand Name," and a second instance of "Blue Buffalo" appears much farther down in the data set, the first user providing the annotations may not remember the previous tag used for the first instance of "Blue Buffalo." As such, the first user may perform a research again to determine an appropriate tag for the second instance, thereby losing time, or may possibly tag the second instance wrongly. By using the annotation tool with the memory, a memory suggestion of the tag used for the first instance to then use for the second instance may reduce a risk of tagging errors, increase quality of the tagging, and increase efficiency of the first user providing the annotations.

As described herein, these techniques may look at annotated data not as strings of tokens but as a database containing a list of token-tag pairs. The data may then be processed with simple operations such as sorting, filtering, and counting (subtotals). The resulting data (e.g., tokens, tags, and frequency of each token-tag pair) may then be organized and presented in ways that expose potential errors in annotation (e.g., sorting by token then tag, sorting by tag then token, indicating the frequency of occurrence data, etc.). Additionally, the described techniques may enable only using text to be annotated and the tags used for the annotations, as well as using available additional data (e.g., established guidelines, historical data, etc.) for the annotation tagging. Features in annotation tools may also be used to provide feedback during the annotation process (e.g., pre-tagging, tagging suggestions, etc.). Accordingly, the techniques described herein may increase a final quality of the annotated data, improving the quality of the annotation by finding errors that may not have been found with sample review.

After the token-tag pairs are checked for inconsistencies and corrected, the system may then provide updated token-tag lists to different operations for use with different implementations. For example, as described with reference to FIG. 3, the updated token-tag lists may be used as part of training a machine learning algorithm to provide more accurate search results for a search query by identifying tokens in the search query and assigning corresponding tags to the identified tokens that are then used to find matching token-tag pairs of search results through the updated token-tag lists. Additionally or alternatively, the updated token-tag lists may be used for other artificial intelligence operations, such as identifying which words in a string to translate and which words to not translate (e.g., brand names may not be translated between languages) or other technologies that could leverage token-tag pair relationships.

Figure 5:
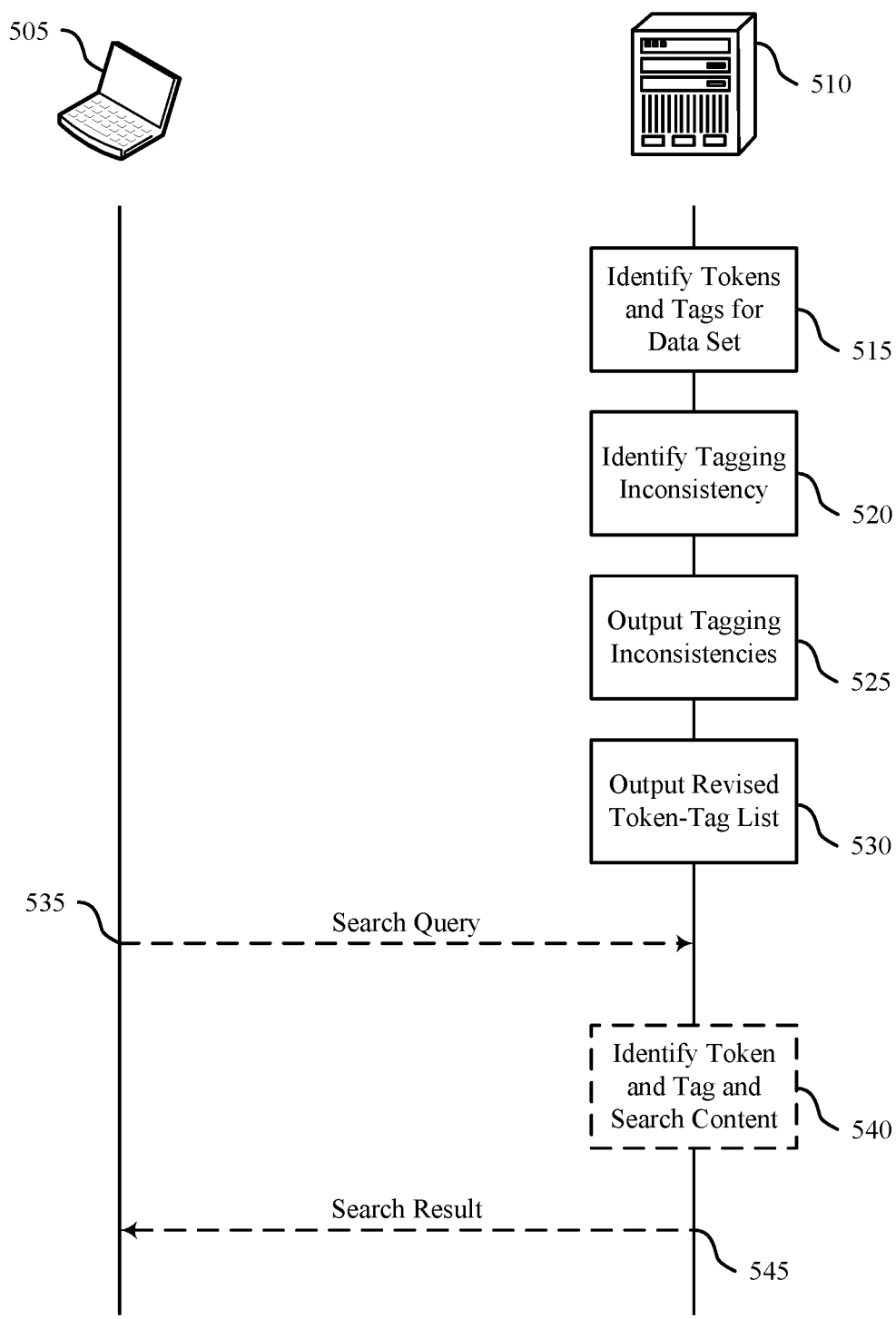
FIG. 5 illustrates an example of a process flow that supports improving the quality of human annotation in accordance with aspects of the present disclosure.

FIG. 5 illustrates an example of a process flow 500 that supports improving the quality of human annotation in accordance with aspects of the present disclosure. Process flow 500 may implement aspects of the system 100 the application flow 200, the system 300, and the user interfaces 400 and 401 described previously. For example, process flow 500 may include a user device 505 and an application server 510, which may represent corresponding user devices and application servers as described with reference to FIGS. 1-4.

In the following description of the process flow 500, the operations between the user device 505 and the application server 510 may be performed in different orders or at different times. Certain operations may also be left out of the process flow 500, or other operations may be added to the process flow 500. It is to be understood that while the user device 505 and the application server 510 are shown performing a number of the operations of process flow 500, any device may perform the operations shown.

At 515, the application server 510 may identify a set of tokens for a data set and a set of tag values assigned to the set of tokens, where each tag value may represent an annotation that indicates a contextual meaning assigned to a respective token of the set of tokens within a context of the data set. For example, the application server 510 may receive an indication of the set of tokens and the set of tag values. In some implementations, each token of the set of tokens may include a word, a character sequence, a span of multiple words or character sequences, or a combination thereof.

At 520, the application server 510 may identify, based on the set of tokens and the set of tag values, a subset of the set of tokens that have been assigned two or more different tag values of the set of tag values. For example, the application server 510 may determine, based on the set of tokens and the set of tag values, that a first tag value is assigned to a first occurrence of a first token within the data set and a second tag value is assigned to a second occurrence of the first token within the data set, where the first tag value is different from the second tag value. Additionally or alternatively, the application server 510 may determine an occurrence count for each tag value assigned to a first token of the set of tokens, for each token associated with a first tag value of the set of token values, or a combination thereof, where the occurrence count may represent a number of times that each tag value appears for the first token, a number of times each token appears for the first tag value, or a combination thereof. In some implementations, the application server 510 may receive an assigned tag value or an annotation guideline for a first token of the subset of the set of tokens (e.g., lists of values, previously tagged data, guideline examples, etc.), where the subset of the set of tokens is identified based on the assigned tag value or the annotation guideline.

At 525, the application server 510 may output the subset of the set of tokens and an indication that multiple different contextual meanings within the context of the data set have been assigned to each token in the subset of the set of tokens. For example, the application server 510 may cause presentation of the subset of the set of tokens via a user interface. In some implementations, the application server 510 may cause presentation of the first tag value, the second tag value, and the first token via the user interface when outputting the subset of the set of tokens. Additionally, the application server 510 may cause presentation of the occurrence count via the user interface. In some implementations, the application server 510 may determine a first tag value of the set of tag values is assigned to a first occurrence of a first token of the subset of the set of tokens and may cause presentation of the first tag value for a next occurrence of the first token within the data set (e.g., suggesting tags).

At 530, the application server 510 may output a revised token-tag list based on the subset of the plurality of tokens. In some implementations, the application server 510 may identify a first token of the subset of the set of tokens and may assign a first tag value of the set of tag values to each occurrence of the first token (e.g., autocorrecting the tag for the token).

At 535, the application server 510 may receive, from the user device 505, a search query via an online marketplace, a search engine, or a combination thereof.

At 540, the application server 510 may identify, based on a machine learning algorithm trained using the revised token-tag list and the data set, a first token in the search query and a first tag value corresponding to the token. Subsequently, the application server 510 may search a content source based on the first token and the first tag value.

At 545, the application server 510 may output, to the user device 505, a search result based on the searching.

Figure 6:
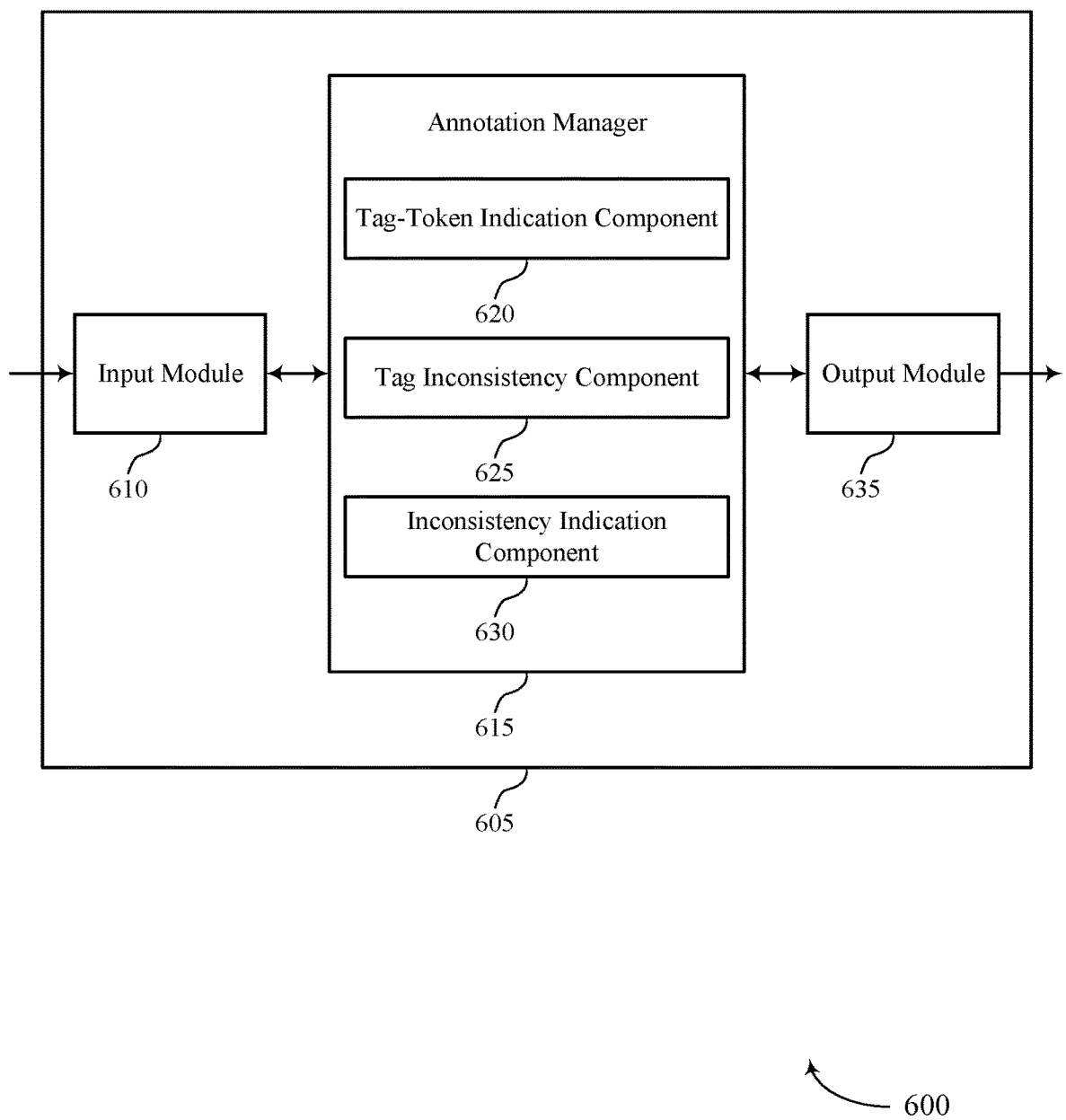
FIG. 6 shows a block diagram of an apparatus that supports improving the quality of human annotation in accordance with aspects of the present disclosure.

FIG. 6 shows a block diagram 600 of an apparatus 605 that supports improving the quality of human annotation in accordance with aspects of the present disclosure. The apparatus 605 may include an input module 610, an annotation manager 615, and an output module 635. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the annotation manager 615 to support improving the quality of human annotation. In some cases, the input module 610 may be a component of an input/output (I/O) controller 815 as described with reference to FIG. 8.

The annotation manager 615 may include a tag-token indication component 620, a tag inconsistency component 625, and an inconsistency indication component 630. The annotation manager 615 may be an example of aspects of the annotation manager 705 or 810 described with reference to FIGS. 7 and 8.

The annotation manager 615 and/or at least some of its various sub-components may be implemented in hardware, software executed by a processor, firmware, or any combination thereof. If implemented in software executed by a processor, the functions of the annotation manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The annotation manager 615 and/or at least some of its various sub-components may be physically located at various positions, including being distributed such that portions of functions are implemented at different physical locations by one or more physical devices. In some examples, the annotation manager 615 and/or at least some of its various sub-components may be a separate and distinct component in accordance with various aspects of the present disclosure. In other examples, the annotation manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The tag-token indication component 620 may receive an indication of a set of tokens for a data set and a set of tag values assigned to the set of tokens, each tag value being an annotation that indicates a contextual meaning assigned to a respective token of the set of tokens within a context of the data set.

The tag inconsistency component 625 may identify, based on the set of tokens and the set of tag values, a subset of the set of tokens that have been assigned two or more different tag values of the set of tag values.

The inconsistency indication component 630 may output the subset of the set of tokens and an indication that multiple different contextual meanings within the context of the data set have been assigned to each token in the subset of the set of tokens.

The output module 635 may manage output signals for the apparatus 605. For example, the output module 635 may receive signals from other components of the apparatus 605, such as the annotation manager 615, and may transmit these signals to other components or devices. In some specific examples, the output module 635 may transmit output signals for display in a user interface, for storage in a database or data store, for further processing at a server or server cluster, or for any other processes at any number of devices or systems. In some cases, the output module 635 may be a component of an I/O controller 815 as described with reference to FIG. 8.

Figure 7:
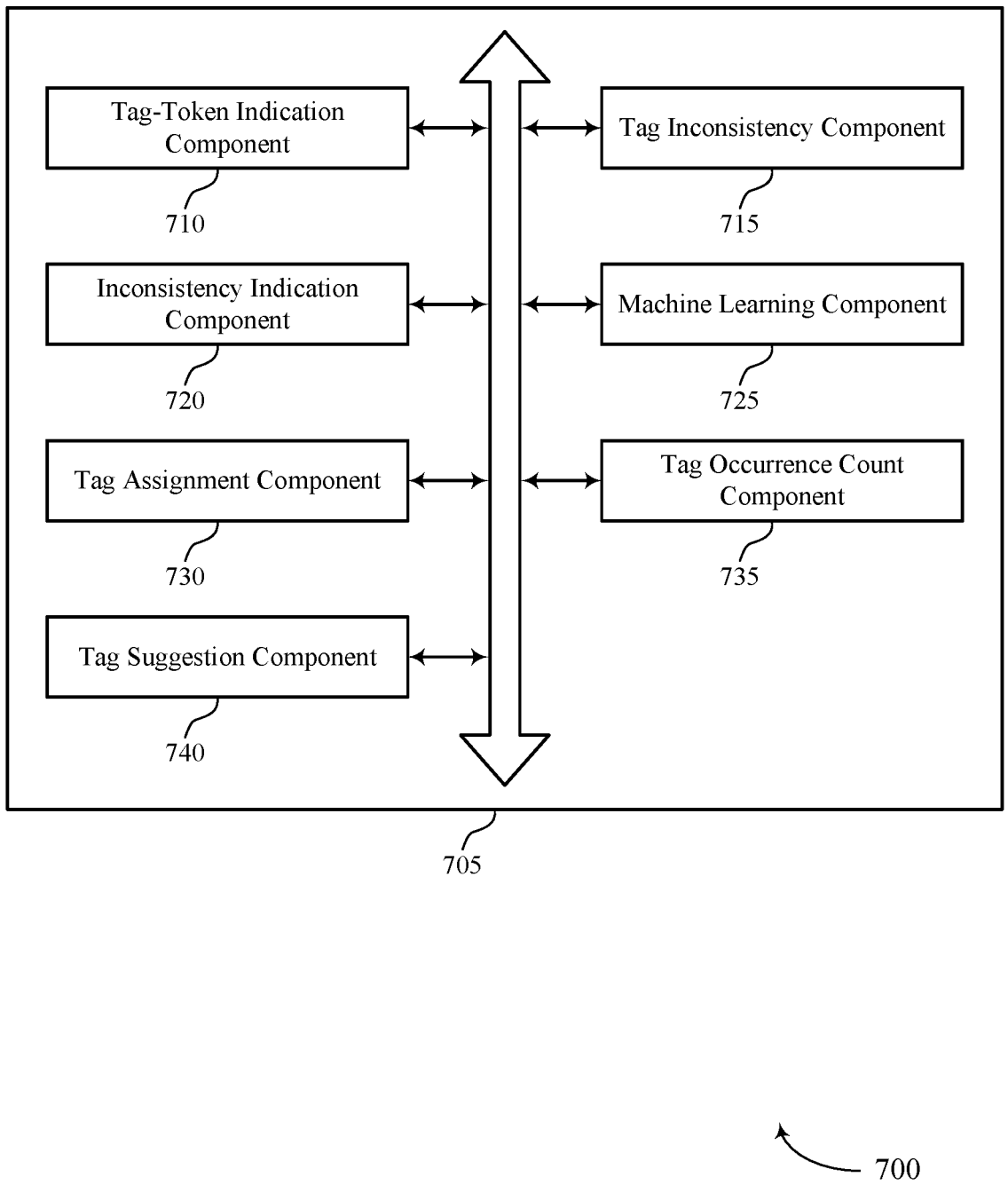
FIG. 7 shows a block diagram of an annotation manager that supports improving the quality of human annotation in accordance with aspects of the present disclosure.

FIG. 7 shows a block diagram 700 of a annotation manager 705 that supports improving the quality of human annotation in accordance with aspects of the present disclosure. The annotation manager 705 may be an example of aspects of a annotation manager 615 or a annotation manager 810 described herein. The annotation manager 705 may include a tag-token indication component 710, a tag inconsistency component 715, an inconsistency indication component 720, a machine learning component 725, a tag assignment component 730, a tag occurrence count component 735, and a tag suggestion component 740. Each of these modules may communicate, directly or indirectly, with one another (e.g., via one or more buses).

The tag-token indication component 710 may receive an indication of a set of tokens for a data set and a set of tag values assigned to the set of tokens, each tag value being an annotation that indicates a contextual meaning assigned to a respective token of the set of tokens within a context of the data set. In some cases, each token of the set of tokens may include a word, a character sequence, a span of multiple words or character sequences, or a combination thereof.

The tag inconsistency component 715 may identify, based on the set of tokens and the set of tag values, a subset of the set of tokens that have been assigned two or more different tag values of the set of tag values. In some examples, the tag inconsistency component 715 may determine, based on the set of tokens and the set of tag values, that a first tag value is assigned to a first occurrence of a first token within the data set and a second tag value is assigned to a second occurrence of the first token within the data set, the first tag value differing from the second tag value, where the outputting includes. Additionally or alternatively, the tag inconsistency component 715 may receive an assigned tag value or an annotation guideline for a first token of the subset of the set of tokens, where the subset of the set of tokens is identified based on the assigned tag value or the annotation guideline.

The inconsistency indication component 720 may output the subset of the set of tokens and an indication that multiple different contextual meanings within the context of the data set have been assigned to each token in the subset of the set of tokens. In some examples, the inconsistency indication component 720 may output a revised token-tag list based on the subset of the set of tokens. Additionally or alternatively, the inconsistency indication component 720 may cause presentation of the first tag value, the second tag value, and the first token via a user interface. In some examples, the inconsistency indication component 720 may cause presentation of the subset of the set of tokens via a user interface.

The machine learning component 725 may receive a search query via an online marketplace, a search engine, or a combination thereof. In some examples, the machine learning component 725 may identify, based on a machine learning algorithm trained using the revised token-tag list and the data set, a first token in the search query and a first tag value corresponding to the token and may search a content source based on the first token and the first tag value. Subsequently, the machine learning component 725 may output a search result based on the searching.

The tag assignment component 730 may identify a first token of the subset of the set of tokens. In some examples, the tag assignment component 730 may assign a first tag value of the set of tag values to each occurrence of the first token.

The tag occurrence count component 735 may determine an occurrence count for each tag value assigned to a first token of the set of tokens, for each token associated with a first tag value of the set of token values, or a combination thereof, the occurrence count including a number of times that each tag value appears for the first token, a number of times each token appears for the first tag value, or a combination thereof. In some examples, the tag occurrence count component 735 may cause presentation of the occurrence count via a user interface.

The tag suggestion component 740 may determine a first tag value of the set of tag values is assigned to a first occurrence of a first token of the subset of the set of tokens, where the outputting includes. In some examples, the tag suggestion component 740 may cause presentation of the first tag value for a next occurrence of the first token within the data set.

Figure 8:
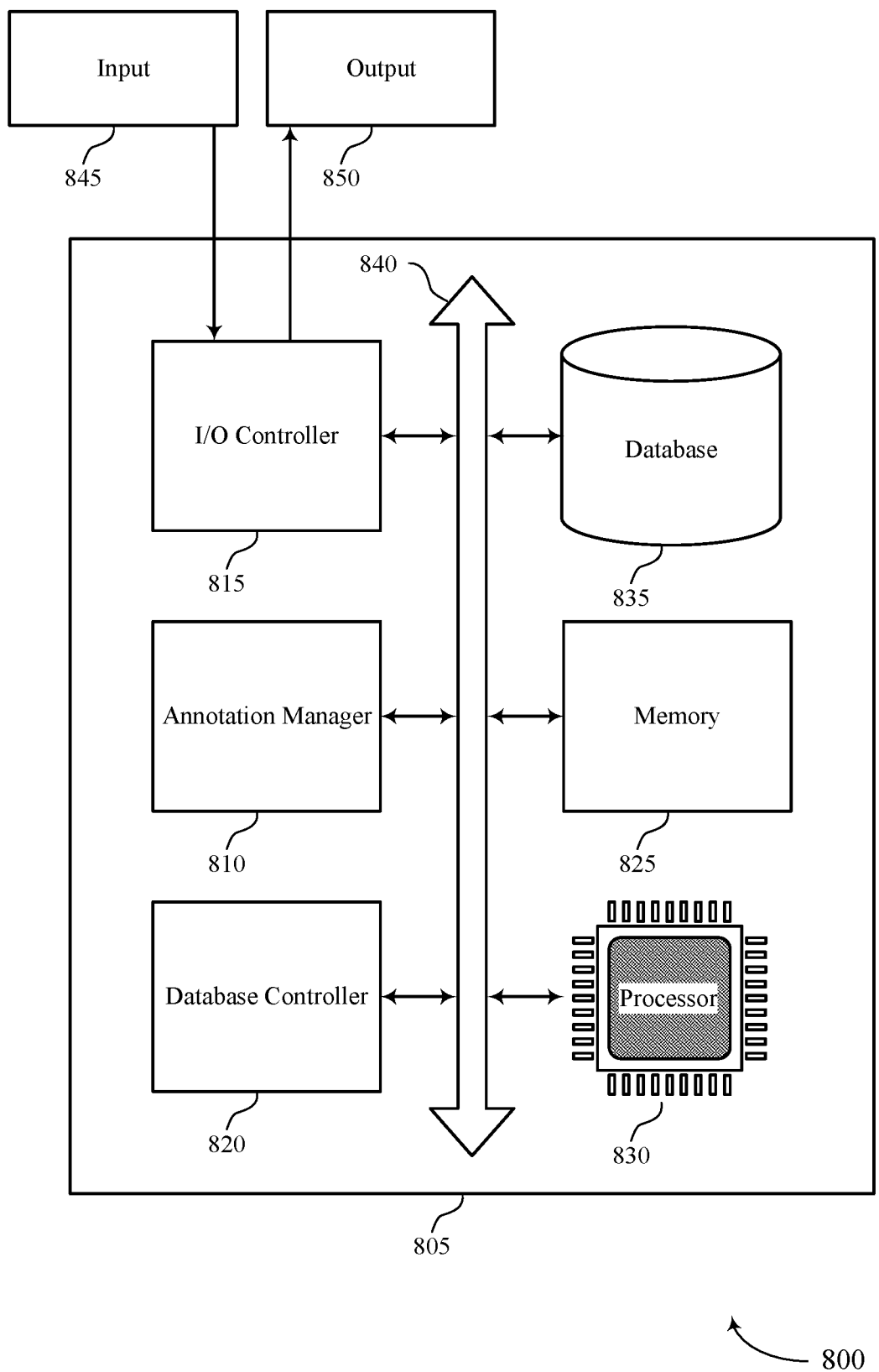
FIG. 8 shows a diagram of a system including a device that supports improving the quality of human annotation in accordance with aspects of the present disclosure.

FIG. 8 shows a diagram of a system 800 including a device 805 that supports improving the quality of human annotation in accordance with aspects of the present disclosure. The device 805 may be an example of or include the components of a database server or an apparatus 605 as described herein. The device 805 may include components for bi-directional data communications including components for transmitting and receiving communications, including an annotation manager 810, an I/O controller 815, a database controller 820, memory 825, a processor 830, and a database 835. These components may be in electronic communication via one or more buses (e.g., bus 840).

The annotation manager 810 may be an example of a annotation manager 615 or 705 as described herein. For example, the annotation manager 810 may perform any of the methods or processes described above with reference to FIGS. 6 and 7. In some cases, the annotation manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting improving the quality of human annotation).

Figure 9:
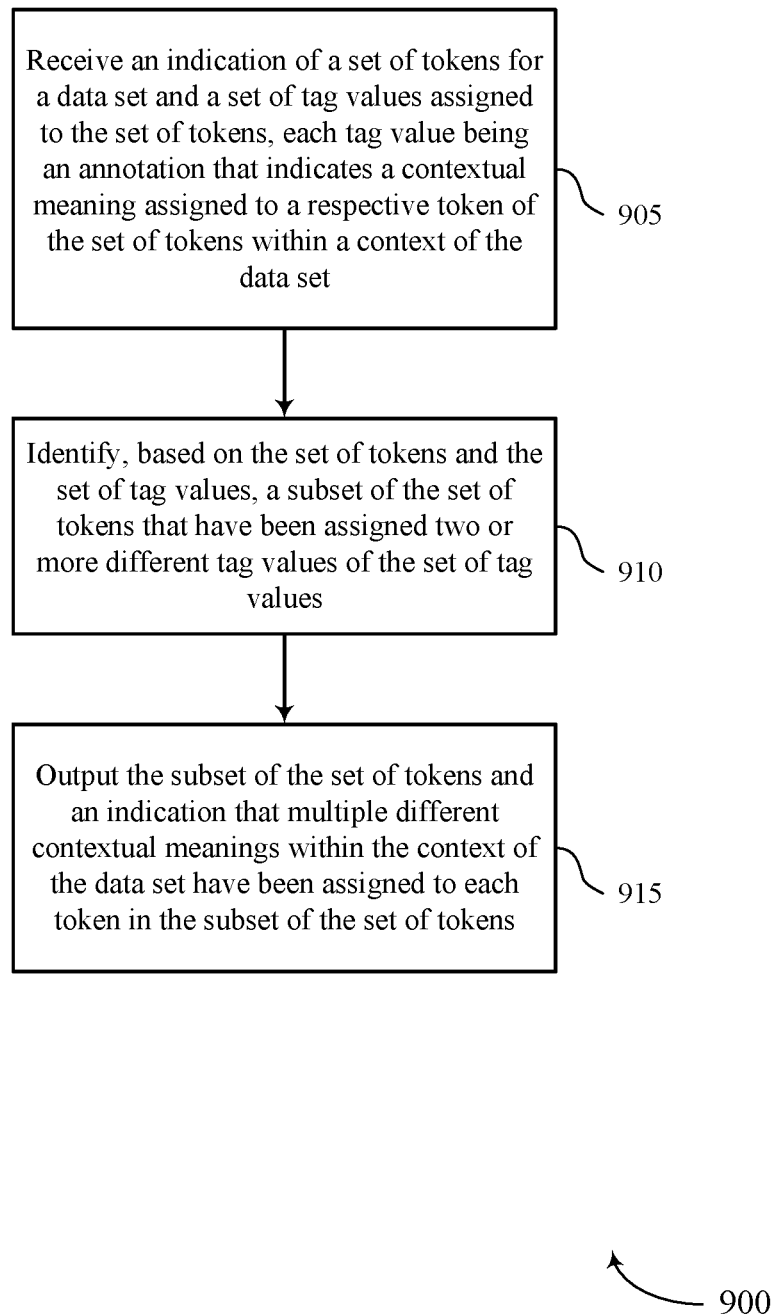
FIGS. 9 through 12 show flowcharts illustrating methods that support improving the quality of human annotation in accordance with aspects of the present disclosure.

FIG. 9 shows a flowchart illustrating a method 900 that supports improving the quality of human annotation in accordance with aspects of the present disclosure. The operations of method 900 may be implemented by a database server or its components as described herein. For example, the operations of method 900 may be performed by a annotation manager as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 905, the database server may receive an indication of a set of tokens for a data set and a set of tag values assigned to the set of tokens, each tag value being an annotation that indicates a contextual meaning assigned to a respective token of the set of tokens within a context of the data set. The operations of 905 may be performed according to the methods described herein. In some examples, aspects of the operations of 905 may be performed by a tag-token indication component as described with reference to FIGS. 6 through 8.

At 910, the database server may identify, based on the set of tokens and the set of tag values, a subset of the set of tokens that have been assigned two or more different tag values of the set of tag values. The operations of 910 may be performed according to the methods described herein. In some examples, aspects of the operations of 910 may be performed by a tag inconsistency component as described with reference to FIGS. 6 through 8.

At 915, the database server may output the subset of the set of tokens and an indication that multiple different contextual meanings within the context of the data set have been assigned to each token in the subset of the set of tokens. The operations of 915 may be performed according to the methods described herein. In some examples, aspects of the operations of 915 may be performed by an inconsistency indication component as described with reference to FIGS. 6 through 8.

Figure 10:
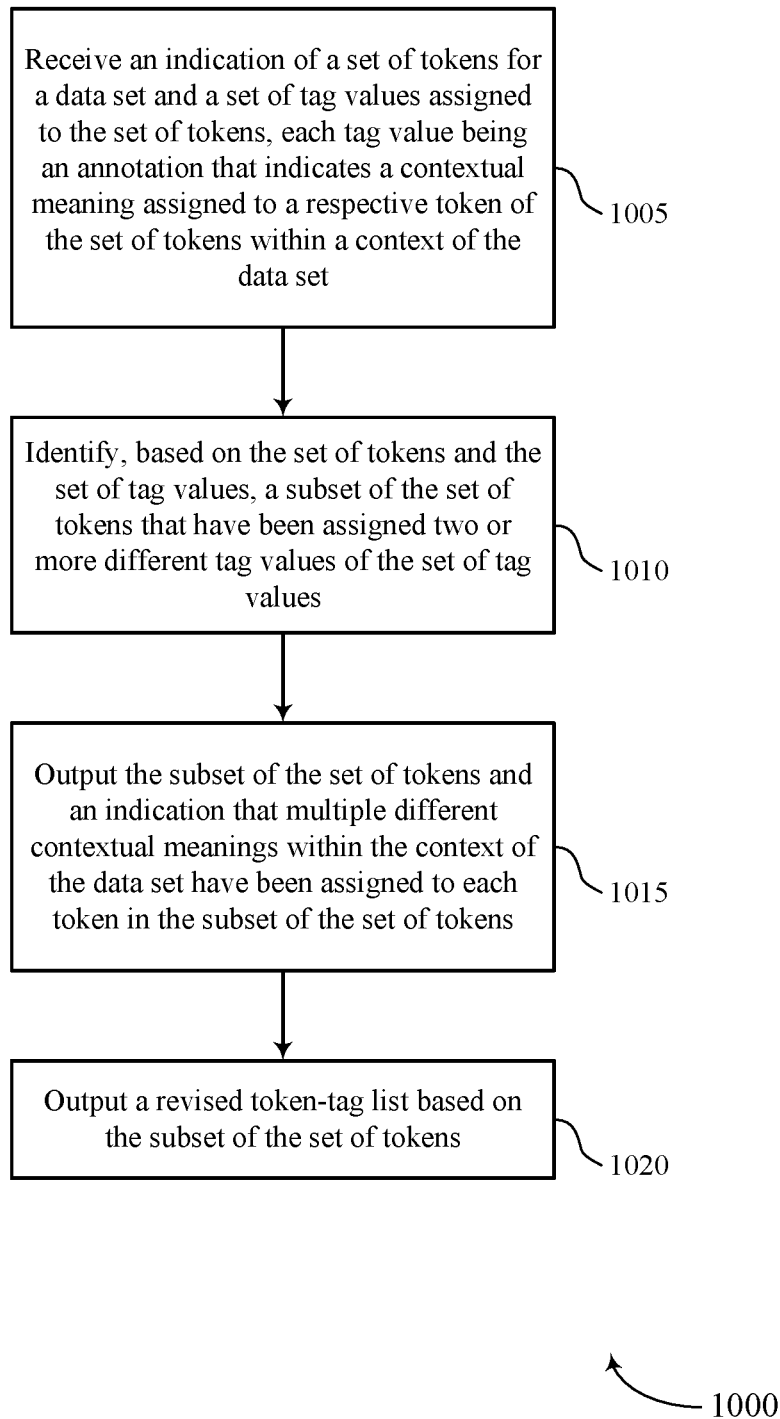

FIG. 10 shows a flowchart illustrating a method 1000 that supports improving the quality of human annotation in accordance with aspects of the present disclosure. The operations of method 1000 may be implemented by a database server or its components as described herein. For example, the operations of method 1000 may be performed by a annotation manager as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1005, the database server may receive an indication of a set of tokens for a data set and a set of tag values assigned to the set of tokens, each tag value being an annotation that indicates a contextual meaning assigned to a respective token of the set of tokens within a context of the data set. The operations of 1005 may be performed according to the methods described herein. In some examples, aspects of the operations of 1005 may be performed by a tag-token indication component as described with reference to FIGS. 6 through 8.

At 1010, the database server may identify, based on the set of tokens and the set of tag values, a subset of the set of tokens that have been assigned two or more different tag values of the set of tag values. The operations of 1010 may be performed according to the methods described herein. In some examples, aspects of the operations of 1010 may be performed by a tag inconsistency component as described with reference to FIGS. 6 through 8.

At 1015, the database server may output the subset of the set of tokens and an indication that multiple different contextual meanings within the context of the data set have been assigned to each token in the subset of the set of tokens. The operations of 1015 may be performed according to the methods described herein. In some examples, aspects of the operations of 1015 may be performed by an inconsistency indication component as described with reference to FIGS. 6 through 8.

At 1020, the database server may output a revised token-tag list based on the subset of the set of tokens. The operations of 1020 may be performed according to the methods described herein. In some examples, aspects of the operations of 1020 may be performed by an inconsistency indication component as described with reference to FIGS. 6 through 8.

Figure 11:
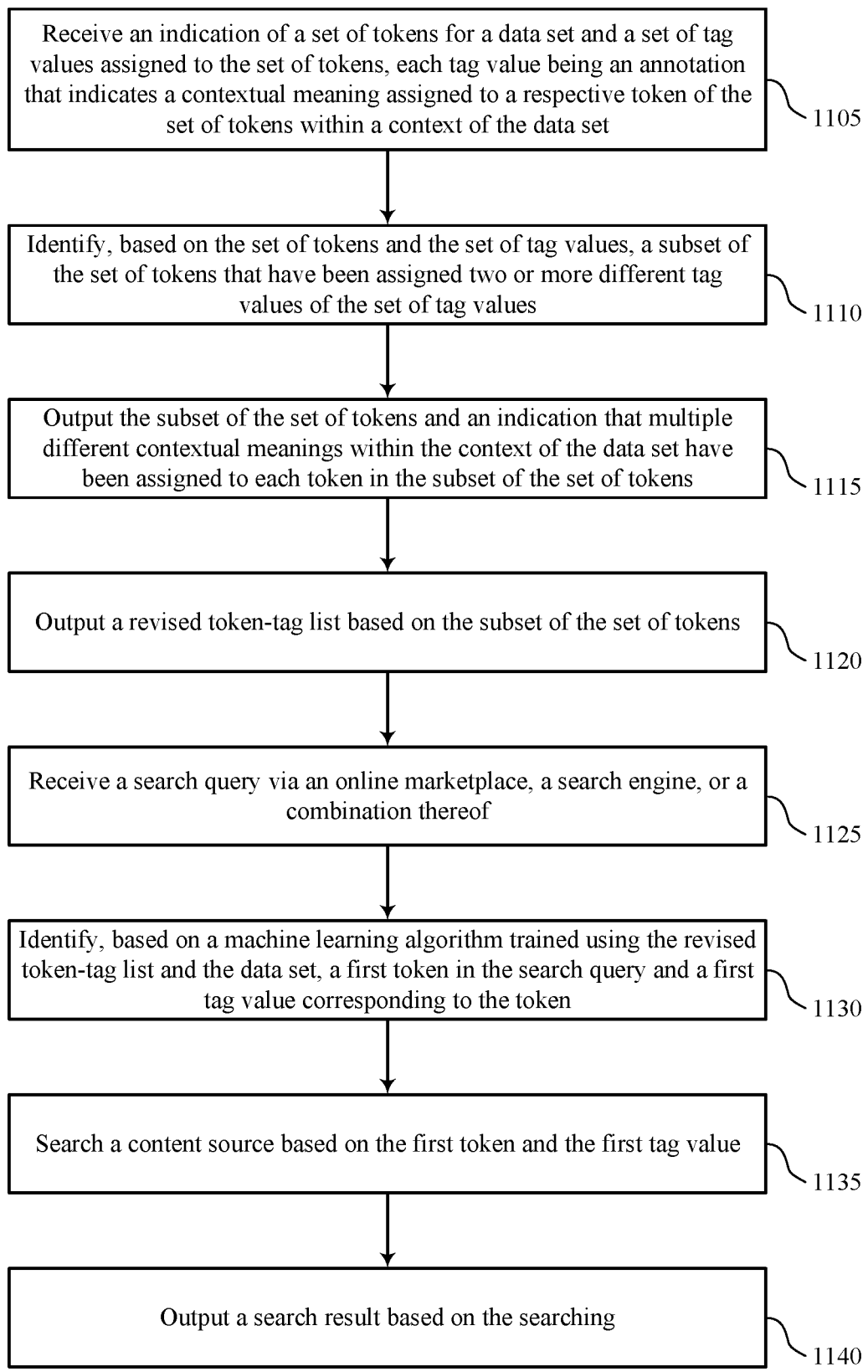

FIG. 11 shows a flowchart illustrating a method 1100 that supports improving the quality of human annotation in accordance with aspects of the present disclosure. The operations of method 1100 may be implemented by a database server or its components as described herein. For example, the operations of method 1100 may be performed by an annotation manager as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1105, the database server may receive an indication of a set of tokens for a data set and a set of tag values assigned to the set of tokens, each tag value being an annotation that indicates a contextual meaning assigned to a respective token of the set of tokens within a context of the data set. The operations of 1105 may be performed according to the methods described herein. In some examples, aspects of the operations of 1105 may be performed by a tag-token indication component as described with reference to FIGS. 6 through 8.

At 1110, the database server may identify, based on the set of tokens and the set of tag values, a subset of the set of tokens that have been assigned two or more different tag values of the set of tag values. The operations of 1110 may be performed according to the methods described herein. In some examples, aspects of the operations of 1110 may be performed by a tag inconsistency component as described with reference to FIGS. 6 through 8.

At 1115, the database server may output the subset of the set of tokens and an indication that multiple different contextual meanings within the context of the data set have been assigned to each token in the subset of the set of tokens. The operations of 1115 may be performed according to the methods described herein. In some examples, aspects of the operations of 1115 may be performed by an inconsistency indication component as described with reference to FIGS. 6 through 8.

At 1120, the database server may output a revised token-tag list based on the subset of the set of tokens. The operations of 1120 may be performed according to the methods described herein. In some examples, aspects of the operations of 1120 may be performed by an inconsistency indication component as described with reference to FIGS. 6 through 8.

At 1125, the database server may receive a search query via an online marketplace, a search engine, or a combination thereof. The operations of 1125 may be performed according to the methods described herein. In some examples, aspects of the operations of 1125 may be performed by a machine learning component as described with reference to FIGS. 6 through 8.

At 1130, the database server may identify, based on a machine learning algorithm trained using the revised token-tag list and the data set, a first token in the search query and a first tag value corresponding to the token. The operations of 1130 may be performed according to the methods described herein. In some examples, aspects of the operations of 1130 may be performed by a machine learning component as described with reference to FIGS. 6 through 8.

At 1135, the database server may search a content source based on the first token and the first tag value. The operations of 1135 may be performed according to the methods described herein. In some examples, aspects of the operations of 1135 may be performed by a machine learning component as described with reference to FIGS. 6 through 8.

At 1140, the database server may output a search result based on the searching. The operations of 1140 may be performed according to the methods described herein. In some examples, aspects of the operations of 1140 may be performed by a machine learning component as described with reference to FIGS. 6 through 8.

Figure 12:
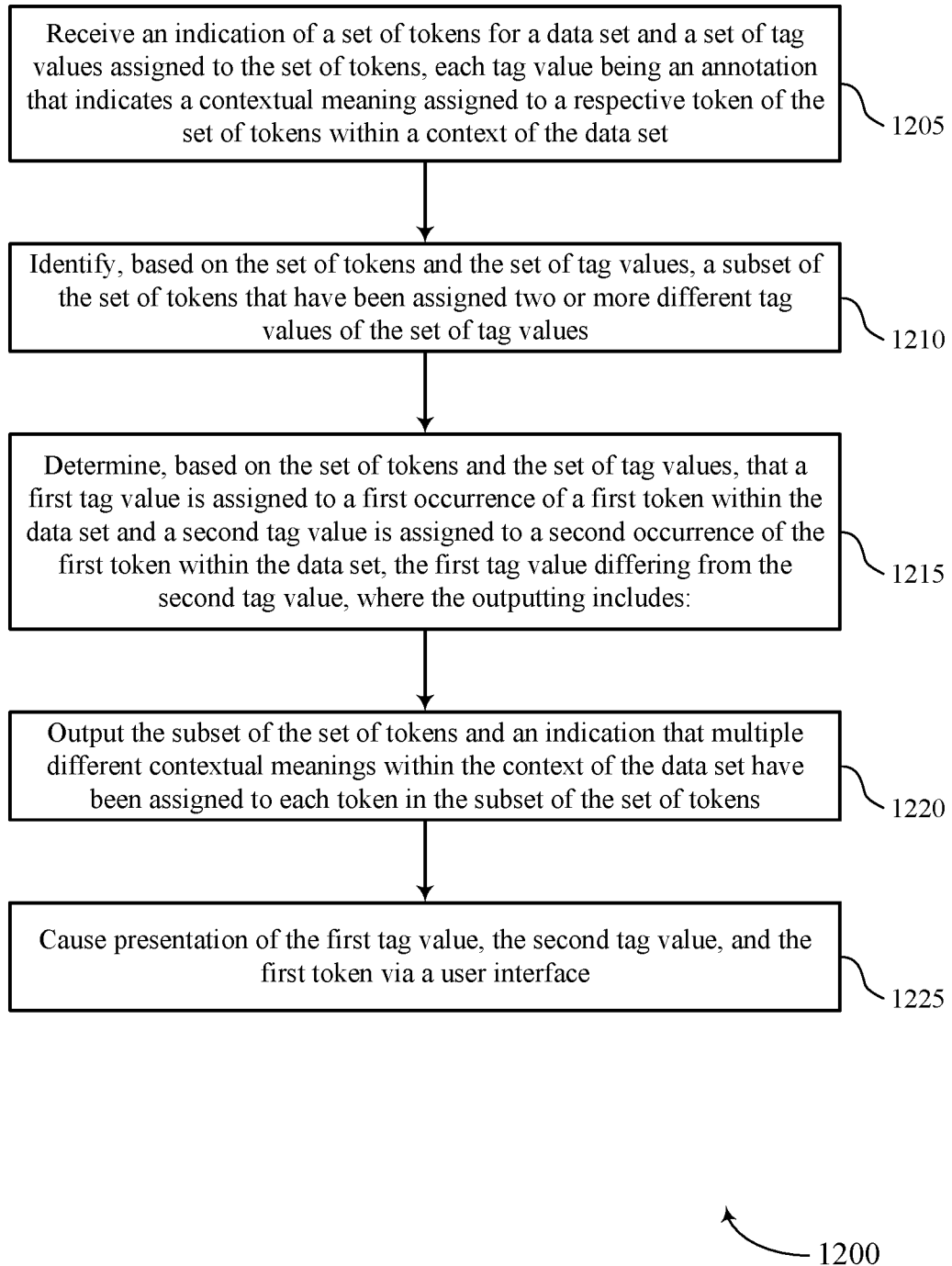

FIG. 12 shows a flowchart illustrating a method 1200 that supports improving the quality of human annotation in accordance with aspects of the present disclosure. The operations of method 1200 may be implemented by a database server or its components as described herein. For example, the operations of method 1200 may be performed by a annotation manager as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1205, the database server may receive an indication of a set of tokens for a data set and a set of tag values assigned to the set of tokens, each tag value being an annotation that indicates a contextual meaning assigned to a respective token of the set of tokens within a context of the data set. The operations of 1205 may be performed according to the methods described herein. In some examples, aspects of the operations of 1205 may be performed by a tag-token indication component as described with reference to FIGS. 6 through 8.

At 1210, the database server may identify, based on the set of tokens and the set of tag values, a subset of the set of tokens that have been assigned two or more different tag values of the set of tag values. The operations of 1210 may be performed according to the methods described herein. In some examples, aspects of the operations of 1210 may be performed by a tag inconsistency component as described with reference to FIGS. 6 through 8.

At 1215, the database server may determine, based on the set of tokens and the set of tag values, that a first tag value is assigned to a first occurrence of a first token within the data set and a second tag value is assigned to a second occurrence of the first token within the data set, the first tag value differing from the second tag value, where the outputting includes. The operations of 1215 may be performed according to the methods described herein. In some examples, aspects of the operations of 1215 may be performed by a tag inconsistency component as described with reference to FIGS. 6 through 8.

At 1220, the database server may output the subset of the set of tokens and an indication that multiple different contextual meanings within the context of the data set have been assigned to each token in the subset of the set of tokens. The operations of 1220 may be performed according to the methods described herein. In some examples, aspects of the operations of 1220 may be performed by an inconsistency indication component as described with reference to FIGS. 6 through 8.

At 1225, the database server may cause presentation of the first tag value, the second tag value, and the first token via a user interface. The operations of 1225 may be performed according to the methods described herein. In some examples, aspects of the operations of 1225 may be performed by an inconsistency indication component as described with reference to FIGS. 6 through 8.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

The invention claimed is:

1. A system for tag annotation, the system comprising:
one or more processors; and
a computer readable medium storing instructions that, when executed by the one or more processors, cause the system to perform operations comprising:
receiving an indication of a word token for a data set and a plurality of inconsistent tag values assigned to the word token, the word token being at least one word extracted from a string of text included in the data set and tag values of the plurality of inconsistent tag values being an annotation that indicates a contextual meaning assigned to the word token within a context of the data set;
determining a frequency of the tag values of the plurality of inconsistent tag values for the word token and other word tokens, wherein the frequency reveals that each inconsistent tag value of the plurality of inconsistent tag values are valid such that the word token and the other word tokens have a plurality of valid inconsistent tag values;
generating a list of tokens having a common tag value of the plurality of inconsistent tag values;
processing, based at least in part on the data set, the word token and the plurality of inconsistent tag values to produce a tag suggestion that identifies a first tag value of the plurality of inconsistent tag values, the tag suggestion being based at least in part on a tag value previously assigned to the word token based on the data set; and
outputting, to a user device:
the tag suggestion identifying the first tag value;
the frequency of the tag values in correspondence to the word token and the other word tokens; and
the list of tokens having the common tag value of the plurality of inconsistent tag values.

2. The system of claim 1, wherein the instructions for processing the word token and the plurality of inconsistent tag values to produce the tag suggestion are executable by the one or more processors to cause the system to perform operations comprising:
identifying that the word token corresponds to text having a predefined tag value;
wherein the tag suggestion comprises the predefined tag value.

3. The system of claim 1, wherein the instructions are further executable by the one or more processors to cause the system to perform operations comprising:
outputting, to the user device, the plurality of inconsistent tag values;
receiving a first indication of a selected tag value of the plurality of inconsistent tag values; and
updating the data set with a second indication that the selected tag value is a correct tag value for the word token.

4. The system of claim 3, wherein the instructions are further executable by the one or more processors to cause the system to perform operations comprising:
receiving a search query via an online marketplace, a search engine, or a combination thereof;
identifying, based at least in part on a machine learning algorithm trained using the updated data set, a first word token in the search query and a second tag value corresponding to the first word token;
searching a content source based at least in part on the first word token and the first tag value; and
outputting a search result based at least in part on searching the content source.

5. The system of claim 3, wherein the instructions are further executable by the one or more processors to cause the system to perform operations comprising:
updating a history associated with the word token to indicate the selected tag value.

6. The system of claim 1, wherein the word token comprises a word, a character sequence, a span of multiple words or character sequences, or a combination thereof.

7. A computer implemented method for tag annotation, the method comprising:
receiving an indication of a word token for a data set and a plurality of inconsistent tag values assigned to the word token, the word token being at least one word extracted from a string of text included in the data set and tag values of the plurality of inconsistent tag values being an annotation that indicates a contextual meaning assigned to the word token within a context of the data set;
determining a frequency of the tag values of the plurality of inconsistent tag values for the word token and other word tokens, wherein the frequency reveals that each inconsistent tag value of the plurality of inconsistent tag values are valid such that the word token and the other word tokens have a plurality of valid inconsistent tag values;
generating a list of tokens having a common tag value of the plurality of inconsistent tag values;
processing, by one or more processors based at least in part on the data set, the word token and the plurality of inconsistent tag values to produce a tag suggestion that identifies a first tag value of the plurality of inconsistent tag values, the tag suggestion being based at least in part on a tag value previously assigned to the word token based on the data set; and
outputting, to a user device:
the tag suggestion identifying the first tag value;
the frequency of the tag values in correspondence to the word token and the other word tokens; and
the list of tokens having the common tag value of the plurality of inconsistent tag values.

8. The method of claim 7, wherein processing the word token and the plurality of inconsistent tag values to produce the tag suggestion comprises:
identifying that the word token corresponds to text having a predefined tag value,
wherein the tag suggestion comprises the predefined tag value.

9. The method of claim 7, further comprising:
outputting, to the user device, the plurality of inconsistent tag values;
receiving a first indication of a selected tag value of the plurality of inconsistent tag values; and updating the data set with a second indication that the selected tag value is a correct tag value for the word token.

10. The method of claim 9, further comprising:
receiving a search query via an online marketplace, a search engine, or a combination thereof;
identifying, based at least in part on a machine learning algorithm trained using the updated data set, a first word token in the search query and a second tag value corresponding to the first word token;
searching a content source based at least in part on the first word token and the first tag value; and
outputting a search result based at least in part on searching the content source.

11. The method of claim 9, further comprising:
updating a history associated with the word token to indicate the selected tag value.

12. The method of claim 7, wherein the word token comprises a word, a character sequence, a span of multiple words or character sequences, or a combination thereof.

13. A non-transitory computer-readable medium for tag annotation, storing instructions which, when executed by a processor, cause a system to perform operations comprising:
receiving an indication of a word token for a data set and a plurality of inconsistent tag values assigned to the word token, the word token being at least one word extracted from a string of text included in the data set and tag values of the plurality of inconsistent tag values being an annotation that indicates a contextual meaning assigned to the word token within a context of the data set;
determining a frequency of the tag values of the plurality of inconsistent tag values for the word token and other word tokens, wherein the frequency reveals that each inconsistent tag value of the plurality of inconsistent tag values are valid such that the word token and the other word tokens have a plurality of valid inconsistent tag values;
generating a list of tokens having a common tag value of the plurality of inconsistent tag values;
processing, based at least in part on the data set, the word token and the plurality of inconsistent tag values to produce a tag suggestion that identifies a first tag value of the plurality of inconsistent tag values, the tag suggestion being based at least in part on a tag value previously assigned to the word token based on the data set; and outputting, to a user device:
the tag suggestion identifying the first tag value;
the frequency of the tag values in correspondence to the word token and the other word tokens; and
the list of tokens having the common tag value of the plurality of inconsistent tag values.

14. The non-transitory computer-readable medium of claim 13, wherein the instructions for processing the word token and the plurality of inconsistent tag values to produce the tag suggestion are executable by the processor to cause the system to perform operations comprising:
identifying that the word token corresponds to text having a predefined tag value;
wherein the tag suggestion comprises the predefined tag value.

15. The non-transitory computer-readable medium of claim 13, wherein the instructions are further executable by the processor to cause the system to perform operations comprising:
outputting, to the user device, the plurality of inconsistent tag values;
receiving a first indication of a selected tag value of the plurality of inconsistent tag values; and
updating the data set with a second indication that the selected tag value is a correct tag value for the word token.

16. The non-transitory computer-readable medium of claim 15, wherein the instructions are further executable by the processor to cause the system to perform operations comprising:
receiving a search query via an online marketplace, a search engine, or a combination thereof;
identifying, based at least in part on a machine learning algorithm trained using the updated data set, a first word token in the search query and a second tag value corresponding to the first word token;
searching a content source based at least in part on the first word token and the first tag value; and
outputting a search result based at least in part on searching the content source.

17. The non-transitory computer-readable medium of claim 15, wherein the instructions are further executable by the processor to cause the processor to perform operations comprising:
updating a history associated with the word token to indicate the selected tag value.

* * * * *